(12) United States Patent
Lin et al.

(10) Patent No.: US 10,652,516 B2
(45) Date of Patent: May 12, 2020

(54) METHOD AND APPARATUS FOR GENERATING AND ENCODING PROJECTION-BASED FRAME WITH 360-DEGREE CONTENT REPRESENTED BY BASE PROJECTION FACE AND LATERAL PROJECTION FACES PACKED IN PYRAMID PROJECTION LAYOUT

(71) Applicant: MEDIATEK INC., Hsin-Chu (TW)

(72) Inventors: Jian-Liang Lin, Yilan County (TW); Peng Wang, Beijing (CN); Hung-Chih Lin, Nantou County (TW); Shen-Kai Chang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 32 days.

(21) Appl. No.: 15/860,671

(22) Filed: Jan. 3, 2018

(65) Prior Publication Data

US 2018/0192024 A1 Jul. 5, 2018

Related U.S. Application Data

(60) Provisional application No. 62/545,596, filed on Aug. 15, 2017, provisional application No. 62/441,607, filed on Jan. 3, 2017.

(30) Foreign Application Priority Data

Jan. 2, 2018 (WO) ................ PCT/CN2018/070029

(51) Int. Cl.
*H04N 13/161* (2018.01)
*G06T 3/00* (2006.01)
(Continued)

(52) U.S. Cl.
CPC ......... *H04N 13/161* (2018.05); *G06T 3/0087* (2013.01); *H04N 13/139* (2018.05);
(Continued)

(58) Field of Classification Search
None
See application file for complete search history.

(56) References Cited

U.S. PATENT DOCUMENTS

| 7,292,722 B2 * | 11/2007 | Lelescu ................ G06T 3/0018 348/36 |
| 2009/0123088 A1 * | 5/2009 | Kallay ................. G06T 3/0062 382/295 |

(Continued)

FOREIGN PATENT DOCUMENTS

| CN | 101852980 A | 10/2010 |
| CN | 104219584 A | 12/2014 |

(Continued)

OTHER PUBLICATIONS

Ono, Shintaro et al., Space-time Analysis of Spherical Projection Image, Proceedings of the 18th International Conference on Pattern Recognition, Dec. 31, 2006.

(Continued)

*Primary Examiner* — Heather R Jones
(74) *Attorney, Agent, or Firm* — Winston Hsu

(57) ABSTRACT

A video processing method includes receiving an omnidirectional content corresponding to a sphere, generating a projection-based frame according to the omnidirectional content and a pyramid projection layout, and encoding, by a video encoder, the projection-based frame to generate a part of a bitstream. The projection-based frame has a 360-degree content represented by a base projection face and a plurality of lateral projection faces packed in the pyramid projection layout. The base projection face and the lateral projection faces are obtained according to at least projection relationship between a pyramid and the sphere.

17 Claims, 14 Drawing Sheets

(51) Int. Cl.
*H04N 13/139* (2018.01)
*H04N 19/597* (2014.01)
*H04N 19/59* (2014.01)
*H04N 19/00* (2014.01)

(52) U.S. Cl.
CPC ............ *H04N 19/00* (2013.01); *H04N 19/59* (2014.11); *H04N 19/597* (2014.11)

(56) References Cited

U.S. PATENT DOCUMENTS

2013/0222534 A1    8/2013  Rusanovskyy
2017/0280126 A1*  9/2017  Van der Auwera .......................... G06T 3/0062

FOREIGN PATENT DOCUMENTS

| CN | 105812759 A | 7/2016 |
| WO | 2016/140082 A1 | 9/2016 |

OTHER PUBLICATIONS

Yu, Matt et al., A Framework to Evaluate Omnidirectional Video Coding Schemes, 2015 IEEE International Symposium on Mixed and Augmented Reality, p. 31-36, Dec. 31, 2015.

"International Search Report" dated Mar. 28, 2018 for International application No. PCT/CN2018/070029, International filed:Jan. 2, 2018.

* cited by examiner

METHOD AND APPARATUS FOR GENERATING AND ENCODING PROJECTION-BASED FRAME WITH 360-DEGREE CONTENT REPRESENTED BY BASE PROJECTION FACE AND LATERAL PROJECTION FACES PACKED IN PYRAMID PROJECTION LAYOUT

CROSS REFERENCE TO RELATED APPLICATIONS

This application claims the benefit of U.S. provisional application No. 62/441,607 filed Jan. 3, 2017 and U.S. provisional application No. 62/545,596 filed Aug. 15, 2017, which are incorporated herein by references.

BACKGROUND

The present invention relates to processing omnidirectional contents (e.g., image contents or video contents), and more particularly, to a method and an apparatus for generating and encoding a projection-based frame with a 360-degree content (e.g., 360-degree image content or 360-degree video content) represented by a base projection face and a plurality of lateral projection faces packed in a pyramid projection layout (e.g., a compact viewport-based pyramid projection layout).

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image/video content corresponding to a sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

SUMMARY

One of the objectives of the claimed invention is to provide a method and an apparatus for generating and encoding a projection-based frame with a 360-degree content (e.g., 360-degree image content or 360-degree video content) represented by a base projection face and a plurality of lateral projection faces packed in a pyramid projection layout (e.g., a compact viewport-based pyramid projection layout). With a proper design of the pyramid projection layout, the projection-based frame can have a compact form, and/or the image content of the user's viewport (i.e., a viewport area) can be preserved in a main projection face (e.g., a base projection face).

According to a first aspect of the present invention, an exemplary video processing method is disclosed. The exemplary video processing method comprises: receiving an omnidirectional content corresponding to a sphere; generating a projection-based frame according to the omnidirectional content and a pyramid projection layout, wherein the projection-based frame has a 360-degree content represented by a base projection face and a plurality of lateral projection faces packed in the pyramid projection layout, and the base projection face and the lateral projection faces are obtained according to at least projection relationship between a pyramid and the sphere; and encoding, by a video encoder, the projection-based frame to generate a part of a bitstream.

According to a second aspect of the present invention, an exemplary video processing apparatus is disclosed. The exemplary video processing apparatus includes a conversion circuit and a video encoder. The conversion circuit is arranged to receive an omnidirectional content corresponding to a sphere, and generate a projection-based frame according to the omnidirectional content and a pyramid projection layout, wherein the projection-based frame has a 360-degree content represented by a base projection face and a plurality of lateral projection faces packed in the pyramid projection layout, and the base projection face and the lateral projection faces are obtained according to at least projection relationship between a pyramid and the sphere. The video encoder is arranged to encode the projection-based frame to generate a part of a bitstream.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
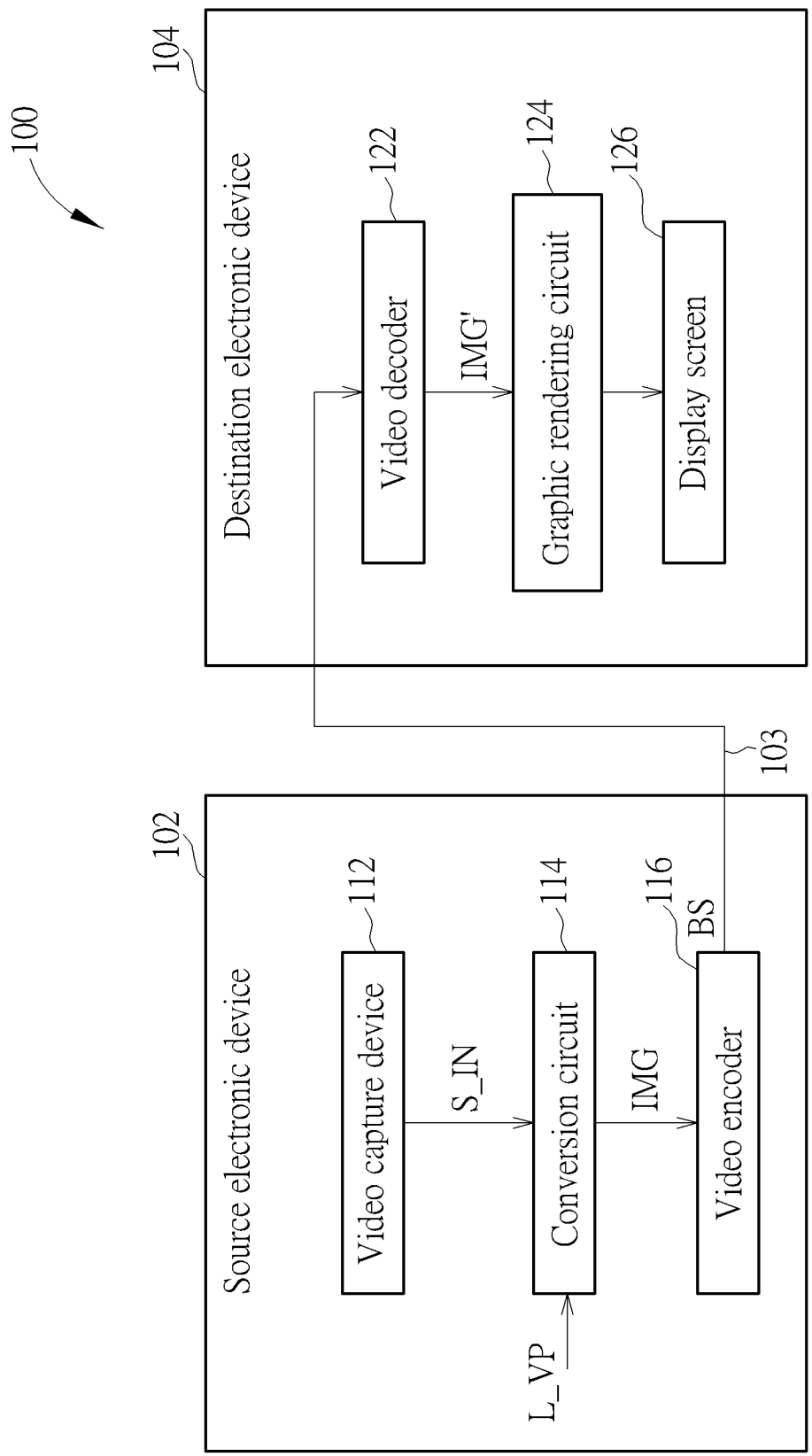
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image/video content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout according to the omnidirectional image/video content S_IN. For example, the projection-based frame IMG may be one frame included in a sequence of projection-based frames generated from the conversion circuit 114. The video encoder 116 is an encoding circuit used to encode/compress the projection-based frame IMG to generate a part of a bitstream BS, and outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display screen 126. The video decoder 122 is a decoding circuit used to receive the bitstream BS from the transmission means 103 (e.g., a wired/wireless communication link or a storage medium), and decode the received bitstream BS to generate a decoded frame IMG'. For example, the video decoder 122 generates a sequence of decoded frames by decoding the received bitstream BS, where the decoded frame IMG' is one frame included in the sequence of decoded frames. In this embodiment, the projection-based frame IMG to be encoded by the video encoder 116 has a 360 VR projection format with a projection layout. Hence, after the bitstream BS is decoded by the video decoder 122, the decoded frame IMG' has the same 360 VR projection format and the same projection layout. The graphic rendering circuit 124 is coupled between the video decoder 122 and the display screen 126. The graphic rendering circuit 124 renders and displays an output image data on the display screen 126 according to the decoded frame IMG'. For example, a viewport area associated with a portion of the 360-degree image/video content carried by the decoded frame IMG' may be displayed on the display screen 126 via the graphic rendering circuit 124.

The present invention proposes an innovative pyramid projection layout design (e.g., a compact viewport-based pyramid projection layout design) that may have a compact form and/or can preserve the image/video content of the user's viewport in a main projection face (e.g., a base projection face). As mentioned above, the conversion circuit 114 generates the projection-based frame IMG according to the 360 VR projection layout and the omnidirectional image/video content S_IN. In this embodiment, the aforementioned 360 VR projection layout is a pyramid projection layout (e.g., compact viewport-based pyramid projection layout) L_VP by packing one base projection face (which corresponds to a base of a pyramid) and a plurality of lateral projection faces (which correspond to a plurality of lateral faces of the pyramid). Specifically, the projection-based frame IMG has a 360-degree image/video content represented by one base projection face and multiple lateral projection faces packed in the proposed pyramid projection layout (e.g., compact viewport-based pyramid projection layout) L_VP. Further details of the proposed pyramid projection layout (e.g., compact viewport-based pyramid projection layout) L_VP are provided hereinafter.

Figure 2:
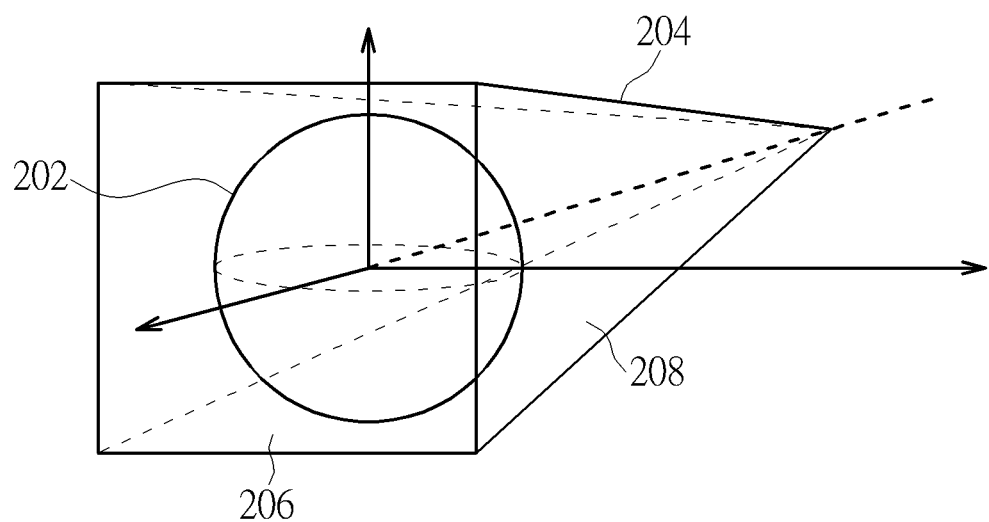
FIG. 2 is a diagram illustrating a first pyramid projection type according to an embodiment of the present invention.
Figure 3:
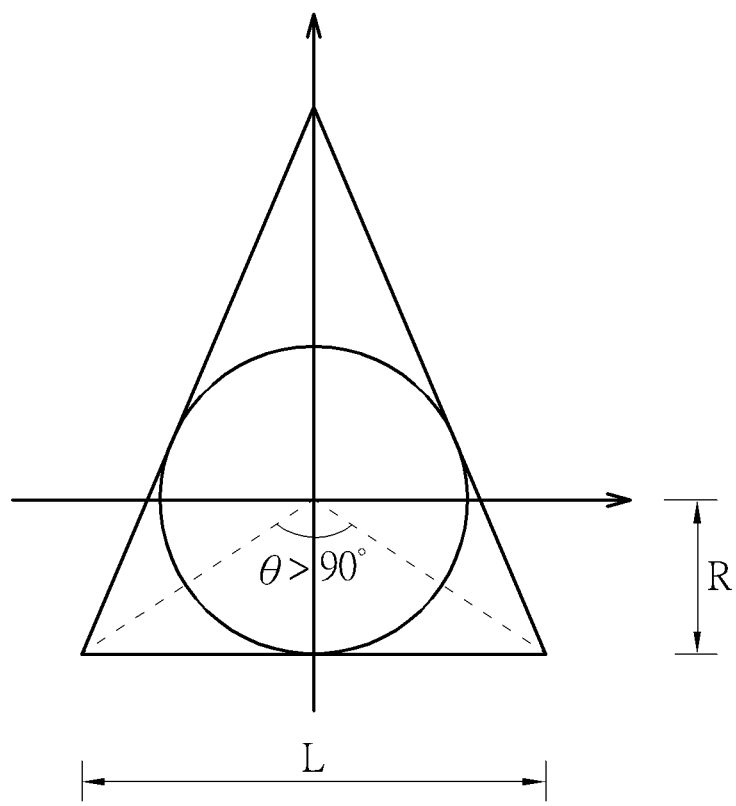
FIG. 3 is a side view of a pyramid and a sphere shown in FIG. 2.

Please refer to FIG. 2 in conjunction with FIG. 3. FIG. 2 is a diagram illustrating a first pyramid projection type according to an embodiment of the present invention. FIG. 3 is a side view of a pyramid and a sphere shown in FIG. 2. In accordance with the first pyramid projection type, a sphere 202 is fully inside a pyramid 204 that is composed of a base 206 and a plurality of lateral faces 208. In this example, a shape of the base 206 is a square, and a shape of each of the lateral faces 208 is a triangle. Further, the sphere 202 is an inscribed sphere of the pyramid 204, such that the sphere 202 is tangent to each face of the pyramid 204.

The omnidirectional image/video content of the sphere 202 is mapped/projected onto the base 206 and the lateral faces 208 of the pyramid 204. Regarding a projection face on the base 206 of the pyramid 204, it may be configured to be a main projection face that contains the image content of the user's viewport. As illustrated in FIG. 3, the main projection face may be a θ×θ square face, where θ is a main viewpoint FOV (field of view) angle that is larger than 90°. Assuming that the edge length of the base 206 is represented by L and the radius of the sphere 202 is represented by R, the main viewpoint FOV angle θ should satisfy the following equation.

$$L = 2 \cdot R \cdot \tan\left(\frac{\theta}{2}\right) \quad (1)$$

Figure 4:
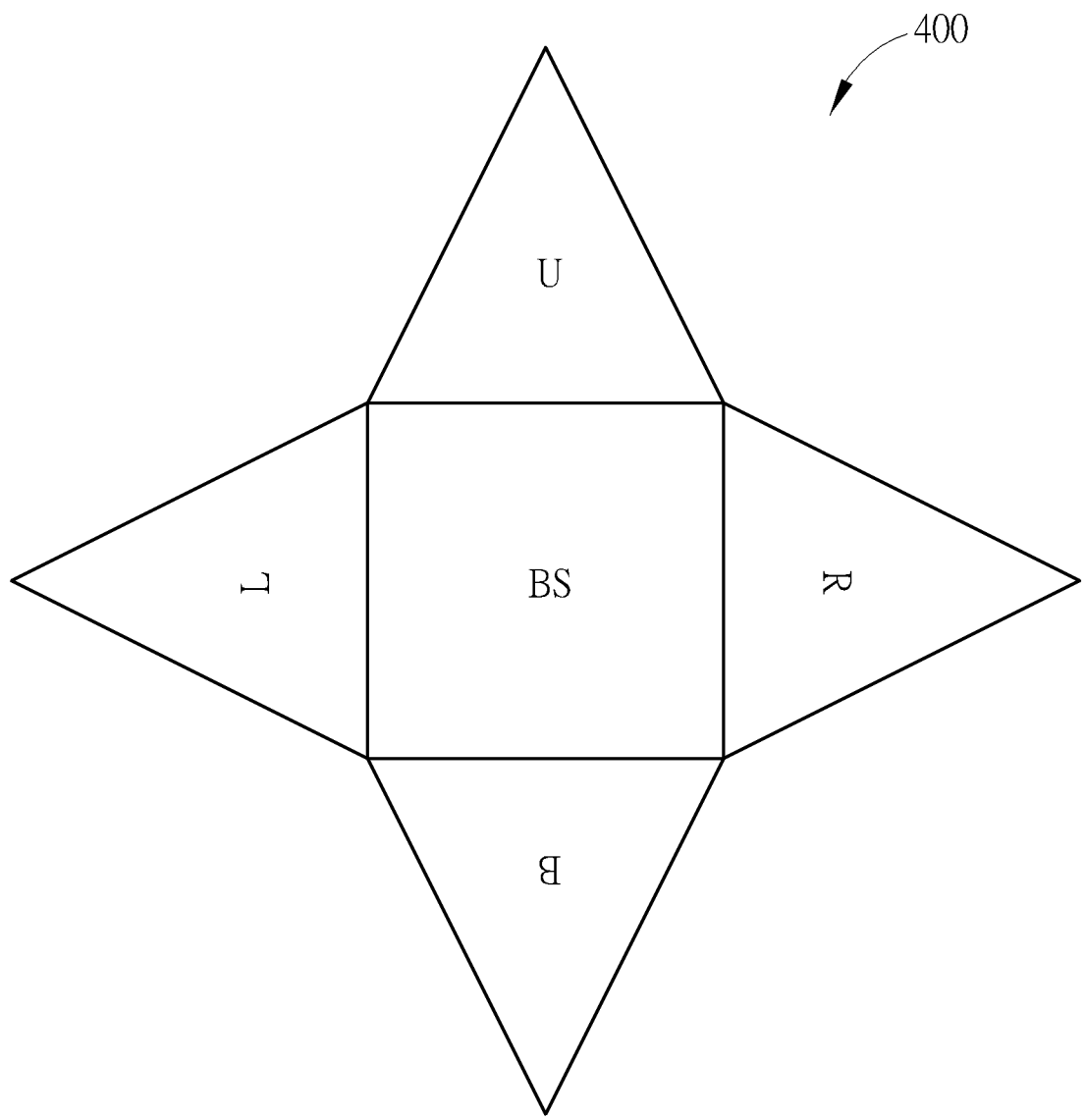
FIG. 4 is a diagram illustrating projection faces of a pyramid projection layout obtained from a pyramid projection of a sphere according to an embodiment of the present invention.

FIG. 4 is a diagram illustrating projection faces of a pyramid projection layout obtained from a pyramid projection of a sphere according to an embodiment of the present invention. In a case where the first pyramid projection type shown in FIG. 2 is employed, the omnidirectional image/video content of the sphere 202 is mapped/projected onto one base 206 and four lateral faces 208 of the pyramid 204, thus resulting in five projection faces including one base projection face (labeled by "BS") and four lateral projection faces (labeled by "U", "L", "B", and "R"). As shown in FIG. 4, a shape of the base projection face BS is a square, and a shape of each of the lateral projection faces U, L, B, and R is a triangle. In addition, the base projection face BS and the lateral projection faces U, L, B, and R are arranged in a pyramid projection layout 400 corresponding to an unfolded pyramid, such that the lateral projection faces U, L, B, and R connect with four sides/edges of the base projection face BS, respectively. It should be noted that an image continuity boundary exists between the lateral projection face U and the base projection face BS, an image continuity boundary exists between the lateral projection face L and the base projection face BS, an image continuity boundary exists between the lateral projection face B and the base projection face BS, and an image continuity boundary exists between the lateral projection face R and the base projection face BS.

The base projection face BS and the lateral projection faces U, L, B, and R are obtained via pyramid projection of the sphere 202. For example, the base projection face BS and the lateral projection faces U, L, B, and R of the pyramid 204 can be obtained according to the first pyramid projection type shown in FIG. 2. However, this is for illustrative purposes only, and is not meant to be a limitation of the present invention. Alternatively, the base projection face BS and the lateral projection faces U, L, B, and R shown in FIG. 4 may be obtained according another pyramid projection type that is different from the first pyramid projection type shown in FIG. 2. Further details of other pyramid projection types are described as below.

Figure 5:
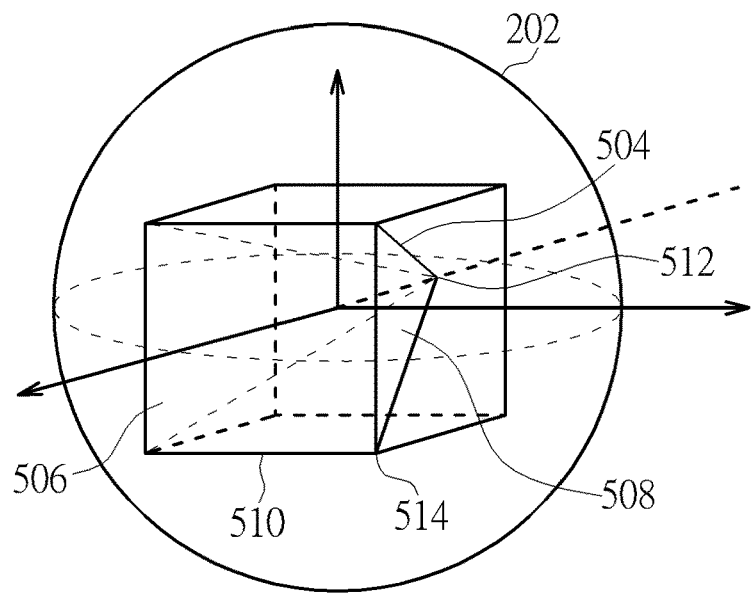
FIG. 5 is a diagram illustrating a second pyramid projection type according to an embodiment of the present invention.
Figure 6:
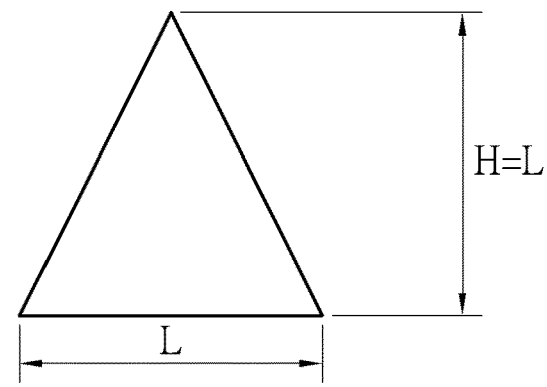
FIG. 6 is a side view of a pyramid and a sphere shown in FIG. 5.
Figure 6:
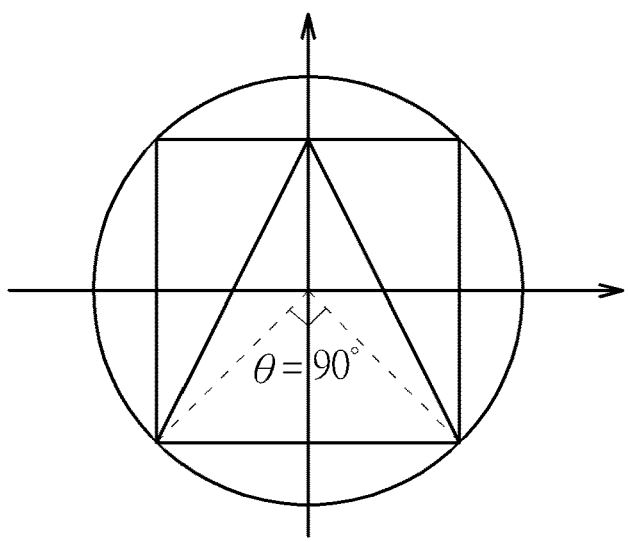

Please refer to FIG. 5 in conjunction with FIG. 6. FIG. 5 is a diagram illustrating a second pyramid projection type according to an embodiment of the present invention. FIG. 6 is a side view of a pyramid and a sphere shown in FIG. 5. In accordance with the second pyramid projection type, a pyramid 504 is fully inside the sphere 202, where the pyramid 504 is composed of a base 506 and a plurality of lateral faces 508. In this example, a shape of the base 506 is a square, and a shape of each of the lateral faces 508 is a triangle. Further, the sphere 202 touches all vertices of the pyramid 504 except an apex 512 of the pyramid 504. Specifically, the sphere 202 touches four vertices 514 located at four corners of the base 506, but does not touch the remaining vertice (i.e., apex 512) of the pyramid 504. As shown in FIG. 6, the height H of the pyramid 504 between the apex 512 and the base 506 is equal to the edge length L of each edge (side) 510 of the base 506 (i.e., H=L).

The omnidirectional image/video content of the sphere 202 is mapped/projected onto the base 506 and the lateral faces 508 of the pyramid 504. In this way, the base projection face BS and the lateral projection faces U, L, B, and R shown in FIG. 4 can be obtained according the second pyramid projection type shown in FIG. 5. Regarding a projection face on the base 506 of the pyramid 504, it may be configured to be a main projection face that contains the image content of the user's viewport. As illustrated in FIG. 6, the main projection face may be a θ×θ square face, where θ is a main viewpoint FOV angle that is equal to 90°.

Figure 7:
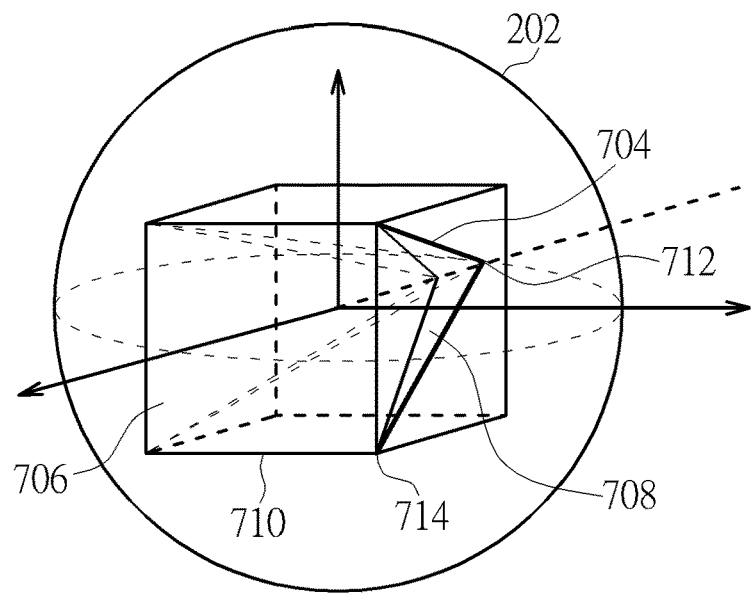
FIG. 7 is a diagram illustrating a third pyramid projection type according to an embodiment of the present invention.
Figure 8:
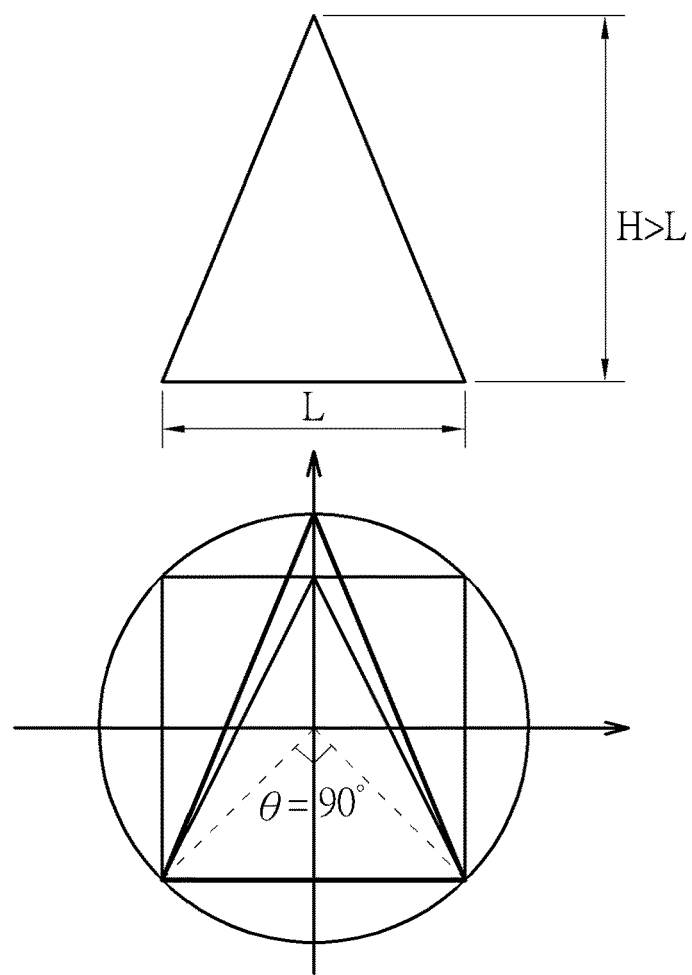
FIG. 8 is a side view of a pyramid and a sphere shown in FIG. 7.

Please refer to FIG. 7 in conjunction with FIG. 8. FIG. 7 is a diagram illustrating a third pyramid projection type according to an embodiment of the present invention. FIG. 8 is a side view of a pyramid and a sphere shown in FIG. 7. In accordance with the third pyramid projection type, a pyramid 704 is fully inside the sphere 202, where the pyramid 704 is composed of a base 706 and a plurality of lateral faces 708. In this example, a shape of the base 706 is a square, and a shape of each of the lateral faces 708 is a triangle. Further, the sphere 202 is a circumscribed sphere of the pyramid 708, such that the sphere 202 touches all vertices of the pyramid 704. Specifically, the sphere 202 touches four vertices 714 located at four corners of the base 706, and also touches the remaining vertice (i.e., apex 712) of the pyramid 704. The major difference between the second pyramid projection type and the third pyramid projection type is the pyramid height. As shown in FIG. 8, the height H of the pyramid 704 between the apex 712 and the base 706 is larger than the edge length L of each edge (side) 710 of the base 706 (i.e., H>L).

The omnidirectional image/video content of the sphere 202 is mapped/projected onto the base 706 and the lateral faces 708 of the pyramid 704. In this way, the base projection face BS and the lateral projection faces U, L, B, and R shown in FIG. 4 can be obtained according the third pyramid projection type shown in FIG. 7. Regarding a projection face on the base 706 of the pyramid 704, it may be configured to be a main projection face that contains the image content of the user's viewport. As illustrated in FIG. 8, the main projection face may be a θ×θ square face, where θ is a main viewpoint FOV angle that is equal to 90'.

Figure 9:
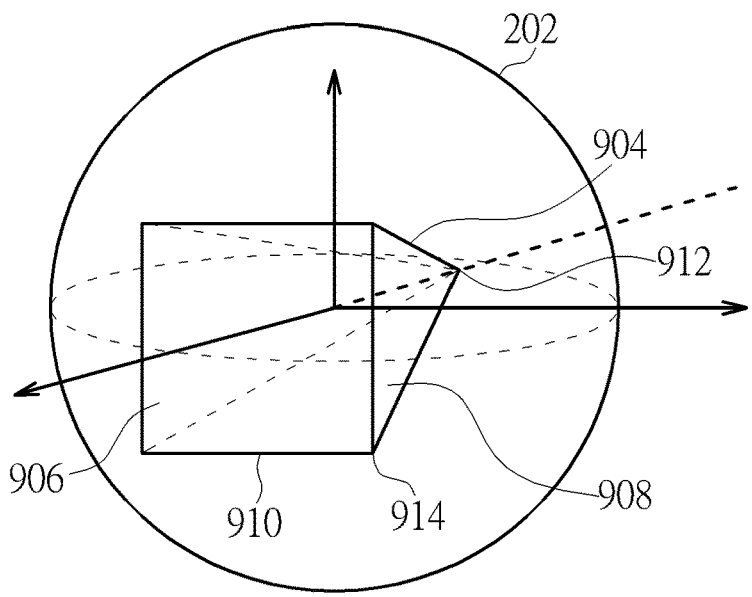
FIG. 9 is a diagram illustrating a fourth pyramid projection type according to an embodiment of the present invention.
Figure 10:
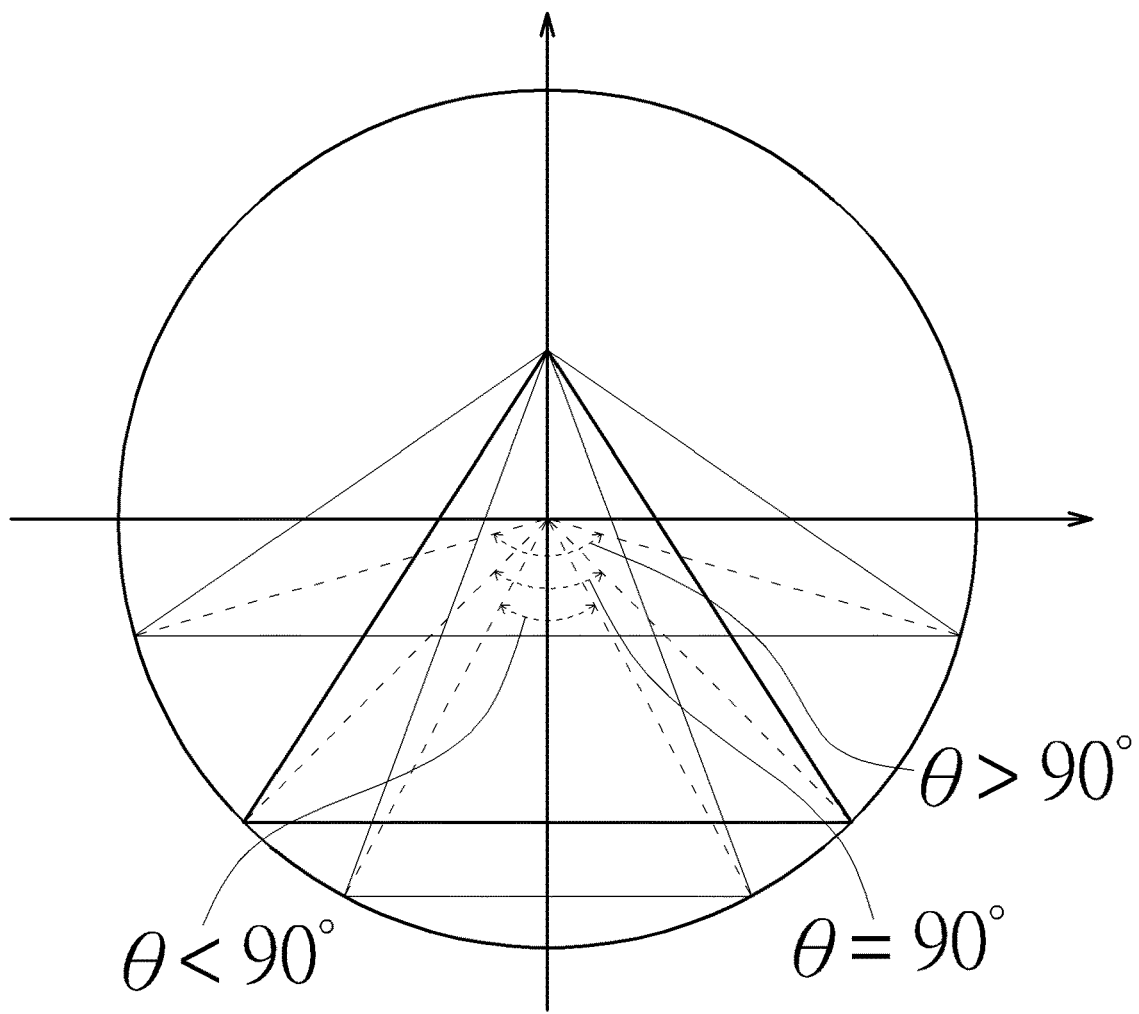
FIG. 10 is a side view of a pyramid and a sphere shown in FIG. 9.

Please refer to FIG. 9 in conjunction with FIG. 10. FIG. 9 is a diagram illustrating a fourth pyramid projection type according to an embodiment of the present invention. FIG. 10 is a side view of a pyramid and a sphere shown in FIG. 9. In accordance with the fourth pyramid projection type, a pyramid 904 is fully inside the sphere 202, where the pyramid 904 is composed of a base 906 and a plurality of lateral faces 908. In this example, a shape of the base 906 is a square, and a shape of each of the lateral faces 908 is a triangle. Further, the sphere 202 touches all vertices of the pyramid 904 except an apex 912 of the pyramid 904. Specifically, the sphere 202 touches four vertices 914 located at four corners of the base 906, but does not touch the remaining vertice (i.e., apex 912) of the pyramid 904. The major difference between the fourth pyramid projection type and the second pyramid projection type is that the FOV angle θ of the fourth pyramid projection type can be set by an arbitrary value. As shown in FIG. 10, a shape of each of the lateral face 908 is an isosceles triangle, and the FOV angle θ may be arbitrarily selected, depending upon the actual design considerations.

The omnidirectional image/video content of the sphere 202 is mapped/projected onto the base 906 and the lateral faces 908 of the pyramid 904. In this way, the base projection face BS and the lateral projection faces U, L, B, and R shown in FIG. 4 can be obtained according the fourth pyramid projection type shown in FIG. 9. Regarding a projection face on the base 906 of the pyramid 904, it may be configured to be a main projection face that contains the image content of the user's viewport. As illustrated in FIG. 10, the main projection face may be a θ×θ square face, where θ is a main viewpoint FOV angle that may be equal to 90°, or smaller than 90°, or larger than 90°. It should be noted the apex 912 and the base 906 should be on opposite sides of a center of the sphere 202 to ensure that the whole omnidirectional image/video content of the sphere 202 can be properly mapped/projected onto the base 906 and the lateral faces 908 of the pyramid 904.

The projection-based frame IMG to be encoded is required to be rectangular. If the pyramid projection layout 400 is directly used for creating the projection-based frame IMG, the projection-based frame IMG has to be filled with dummy areas (e.g., black areas or white areas) to form a rectangular frame for encoding. Thus, there is a need for a compact projection layout that can eliminate/reduce dummy areas (e.g., black areas or white areas) to improve the coding efficiency. The present invention proposes a viewport-based pyramid projection layout design that has a compact form and can preserve the image/video content of the user's viewport (i.e., viewport area) in a main projection face (e.g., a base projection face).

Figure 11:
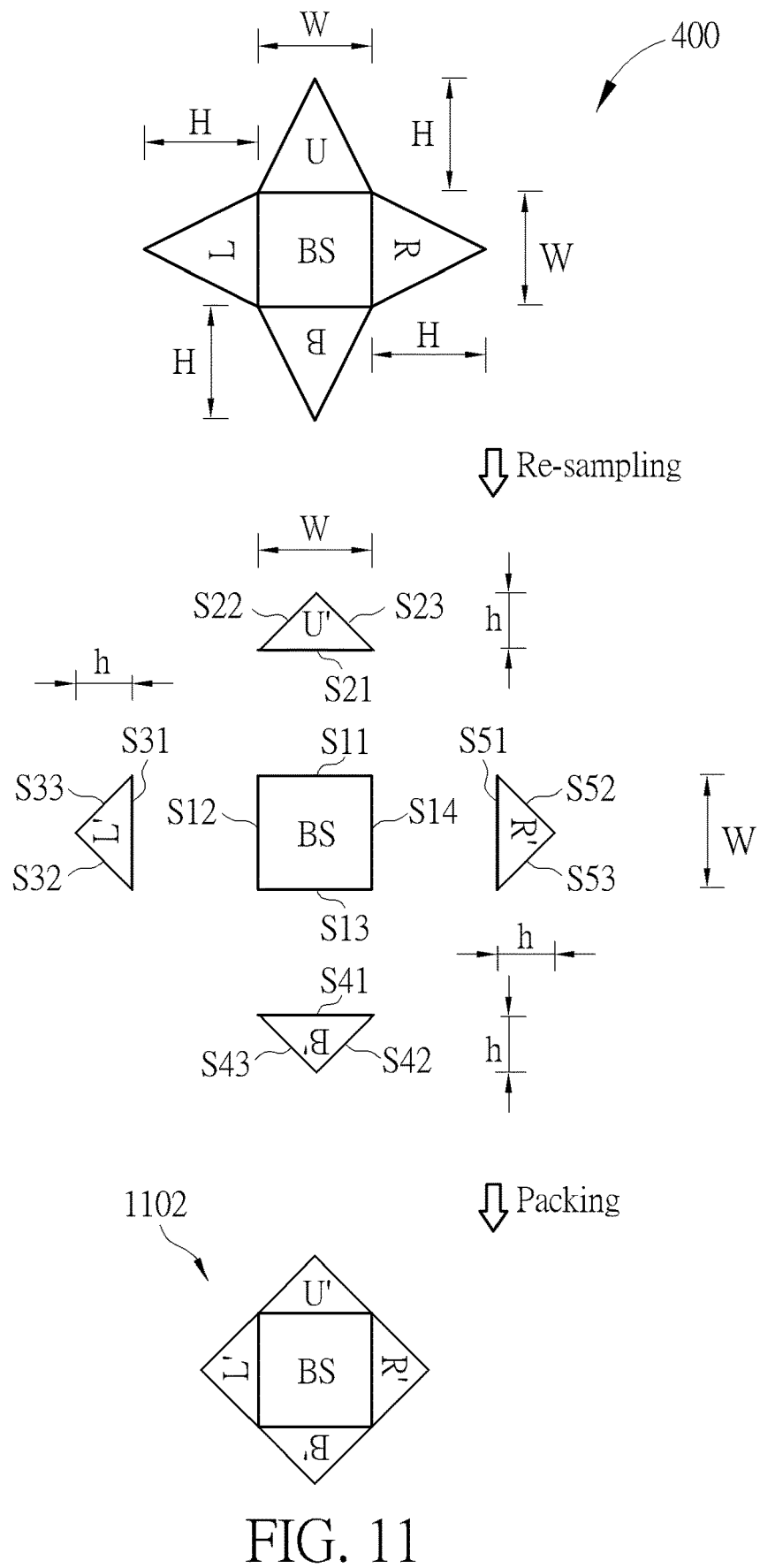
FIG. 11 is a diagram illustrating a first proposed viewport-based pyramid projection layout according to an embodiment of the present invention.

FIG. 11 is a diagram illustrating a first proposed viewport-based pyramid projection layout according to an embodiment of the present invention. The first proposed viewport-based pyramid projection layout 1102 may be derived from the pyramid projection layout 400 with projection face re-sampling (e.g., projection face down-scaling). As shown in the top part of FIG. 11, a shape of each of the lateral projection faces U, B, L, and R is a triangle. The width of each lateral projection face U/B/L/R (i.e., the length of a base of a triangle) is W, and the height of each lateral projection face U/B/L/R (i.e., the distance from the top of the triangle to the base of the triangle) is H. It should be noted that the width W of each lateral projection face U/B/L/R is equal to the edge length of the base projection face BS.

As shown in the middle part of FIG. 11, a lateral projection face U' is a re-sampled projection face obtained by re-sampling (e.g., down-scaling) the lateral projection face U in its height direction with a pre-defined re-sampling factors (s=H/h), a lateral projection face B' is a re-sampled projection face obtained by re-sampling (e.g., down-scaling) the lateral projection face B in its height direction with the pre-defined re-sampling factor s (s=H/h), a lateral projection face L' is a re-sampled projection face obtained by re-sampling (e.g., down-scaling) the lateral projection face L in its height direction with the pre-defined re-sampling factor s (s=H/h), and a lateral projection face R' is a re-sampled projection face obtained by re-sampling (e.g., down-scaling) the lateral projection face R in its height direction with the pre-defined re-sampling factor s (s=H/h).

In this example, a shape of the base projection layout BS is a square, and a shape of each of the lateral projection faces U', B', L' and R' is a right triangle. Specifically, the base projection layout BS has four sides S11, S12, S13, and S14; the lateral projection face U' has one hypotenuse S21 and two cathetus (legs) S22 and S23; the lateral projection face L' has one hypotenuse S31 and two cathetus (legs) S32 and S33; the lateral projection face B' has one hypotenuse S41 and two cathetus (legs) S42 and S43; and the lateral projection face R' has one hypotenuse S51 and two cathetus (legs) S52 and S53.

Moreover, the base projection face BS in the pyramid projection layout 400 corresponds to a user's viewport, and is directly used as a base projection face needed by the first proposed viewport-based pyramid projection layout 1102. The base projection face BS (which is a square projection face) and the four lateral projection faces U', B', L', and R' (which are right-triangle-shaped projection faces) are packed in the first proposed viewport-based pyramid projection layout 1102. As shown in the bottom part of FIG. 11, hypotenuse S21 of the lateral projection face U' connects with side S11 of the base projection face BS, hypotenuse S31 of the lateral projection face L' connects with side S12 of the base projection face BS, hypotenuse S41 of the lateral projection face B' connects with side S13 of the base projection face BS, and hypotenuse S51 of the lateral projection face R' connects with side S14 of the base projection face BS.

As mentioned above, the pyramid projection layout 400 corresponds to an unfolded pyramid, where an image continuity boundary exists between the lateral projection face U and the base projection face BS, an image continuity boundary exists between the lateral projection face L and the base projection face BS, an image continuity boundary exists between the lateral projection face B and the base projection face BS, and an image continuity boundary exists between the lateral projection face R and the base projection face BS. Since the lateral projection face U' is a re-sampled version of the lateral projection face U that is adjacent to the base projection face BS, there is an image continuity boundary between the hypotenuse S21 of the lateral projection face U' and the side S11 of the base projection face BS. Since the lateral projection face L' is a re-sampled version of the lateral projection face L that is adjacent to the base projection face BS, there is an image continuity boundary between the hypotenuse S31 of the lateral projection face L' and the side S12 of the base projection face BS. Since the lateral projection face B' is a re-sampled version of the lateral projection face B that is adjacent to the base projection face BS, there is an image continuity boundary between the hypotenuse S41 of the lateral projection face B' and the side S13 of the base projection face BS. Since the lateral projection face R' is a re-sampled version of the lateral projection face R that is adjacent to the base projection face BS, there is an image continuity boundary between the hypotenuse S51 of the lateral projection face R' and the side S14 of the base projection face BS.

Compared to the pyramid projection layout 400, the first proposed viewport-based pyramid projection layout 1102 is more compact due to the fact that a shape of the first proposed viewport-based pyramid projection layout 1102 is a square. In this way, a compact viewport-based pyramid projection layout is achieved, and can be used by the projection-based frame IMG to reduce dummy areas (e.g., black areas or white areas) filled in the projection-based frame IMG. Further, the 360-degree image/video content is continuously represented in the base projection face BS and the lateral projection faces U', B', L', and R' with no image content discontinuity. That is, there is no image content discontinuity boundary caused by packing of projection faces. In this way, the coding efficiency is not degraded by the first proposed viewport-based pyramid projection layout 1102.

Figure 12:
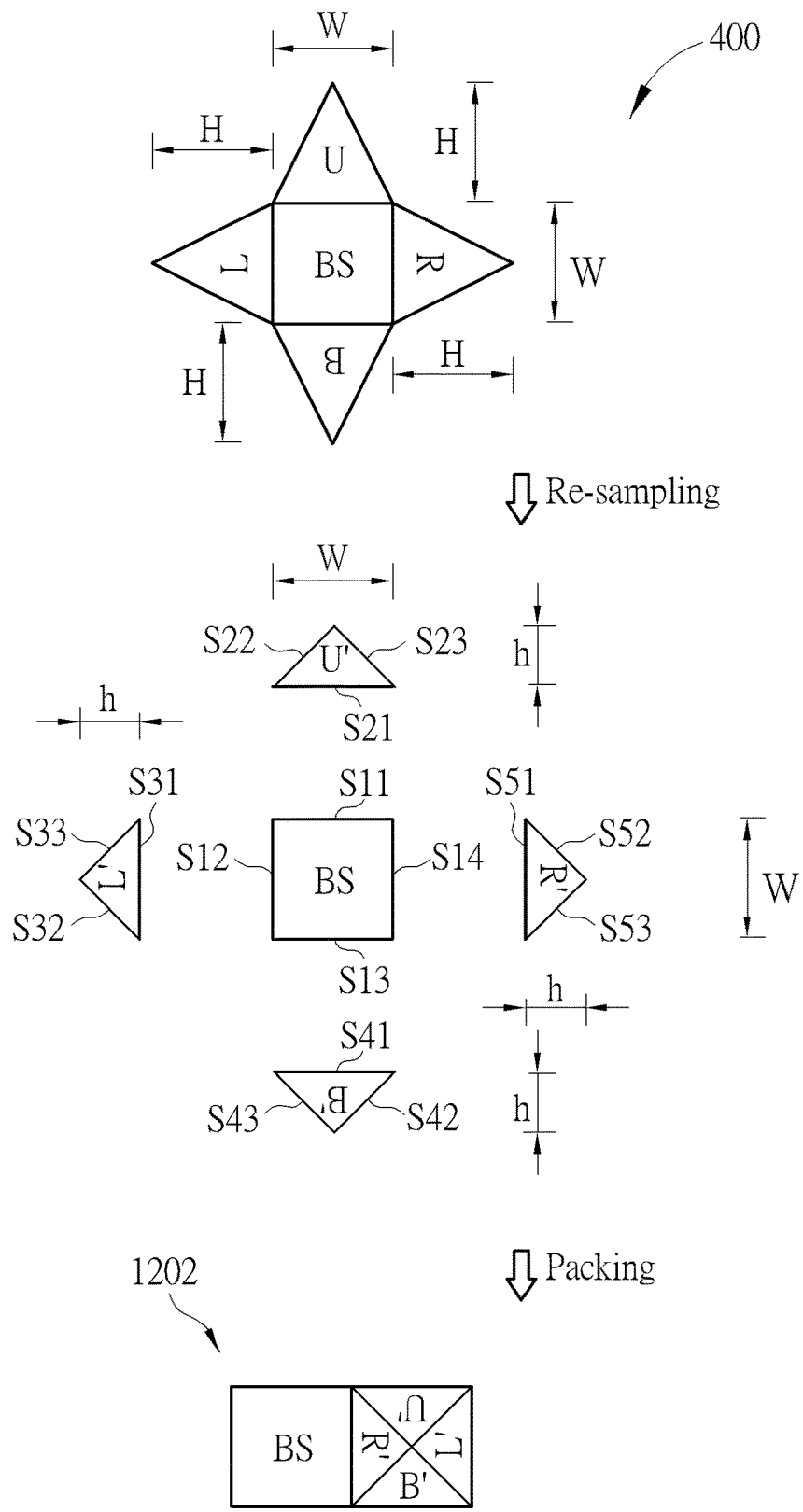
FIG. 12 is a diagram illustrating a second proposed viewport-based pyramid projection layout according to an embodiment of the present invention.

FIG. 12 is a diagram illustrating a second proposed viewport-based pyramid projection layout according to an embodiment of the present invention. The second proposed viewport-based pyramid projection layout 1202 may be derived from the pyramid projection layout 400 with projection face re-sampling (e.g., projection face down-scaling). As mentioned above, the lateral projection face U' is a re-sampled projection face obtained by re-sampling (e.g., down-scaling) the lateral projection face U in its height direction with the pre-defined re-sampling factor s (s=H/h), the lateral projection face B' is a re-sampled projection face obtained by re-sampling (down-scaling) the lateral projection face B in its height direction with the pre-defined re-sampling factor s (s=H/h), the lateral projection face L' is a re-sampled projection face obtained by re-sampling (e.g., down-scaling) the lateral projection face L in its height direction with the pre-defined re-sampling factor s (s=H/h), and the lateral projection face R' is a re-sampled projection face obtained by re-sampling (e.g., down-scaling) the lateral projection face R in its height direction with the pre-defined re-sampling factor s (s=H/h). After the lateral projection faces U', B', L', and R' are obtained, the base projection face BS (which is a square projection face corresponding to a user's viewport) and the four lateral projection faces U', B', L', and R' (which are right-triangle-shaped projection faces) are packed in the second proposed viewport-based pyramid projection layout 1202.

As shown in the bottom part of FIG. 12, hypotenuse S51 of the lateral projection face R' connects with side S14 of the base projection face BS, cathetus S52 of the lateral projection face R' connects with cathetus S23 of the lateral projection face U', cathetus S53 of the lateral projection face R' connects with cathetus S42 of the lateral projection face B', cathetus S33 of the lateral projection face L' connects with cathetus S22 of the lateral projection face U', and cathetus S32 of the lateral projection face L' connects with cathetus S43 of the lateral projection face B'.

As mentioned above, the pyramid projection layout 400 corresponds to an unfolded pyramid, where an image continuity boundary exists between the lateral projection face U and the base projection face BS, an image continuity boundary exists between the lateral projection face L and the base projection face BS, an image continuity boundary exists between the lateral projection face B and the base projection face BS, and an image continuity boundary exists between the lateral projection face R and the base projection face BS. Since the lateral projection face U' is a re-sampled version of the lateral projection face U, the lateral projection face B' is a re-sampled version of the lateral projection face B, the lateral projection face L' is a re-sampled version of the lateral projection face L, and the lateral projection face R' is a re-sampled version of the lateral projection face R, an image continuity boundary exists between the hypotenuse S51 of the lateral projection face R' and the side S14 of the base projection face BS, an image continuity boundary exists between the cathetus S52 of the lateral projection face R' and the cathetus S23 of the lateral projection face U', an image continuity boundary exists between the cathetus S53 of the lateral projection face R' and the cathetus S42 of the lateral projection face B', an image continuity boundary exists between the cathetus S33 of the lateral projection face L' and the cathetus S22 of the lateral projection face U', and an image continuity boundary exists between the cathetus S32 of the lateral projection face L' and the cathetus S43 of the lateral projection face B'.

Compared to the pyramid projection layout 400, the second proposed viewport-based pyramid projection layout 1202 is more compact due to the fact that a shape of the second proposed viewport-based pyramid projection layout 1202 is a rectangle. In this way, a compact viewport-based pyramid projection layout is achieved, and can be used by the projection-based frame IMG to avoid the use of dummy areas (e.g., black areas or white areas) in the projection-based frame IMG. Further, the 360-degree image/video content is continuously represented in the base projection face BS and the lateral projection faces U', B', L', and R' with no image content discontinuity. That is, there is no image content discontinuity boundary caused by packing of projection faces. In this way, the coding efficiency is not degraded by the second proposed viewport-based pyramid projection layout 1202.

Figure 13:
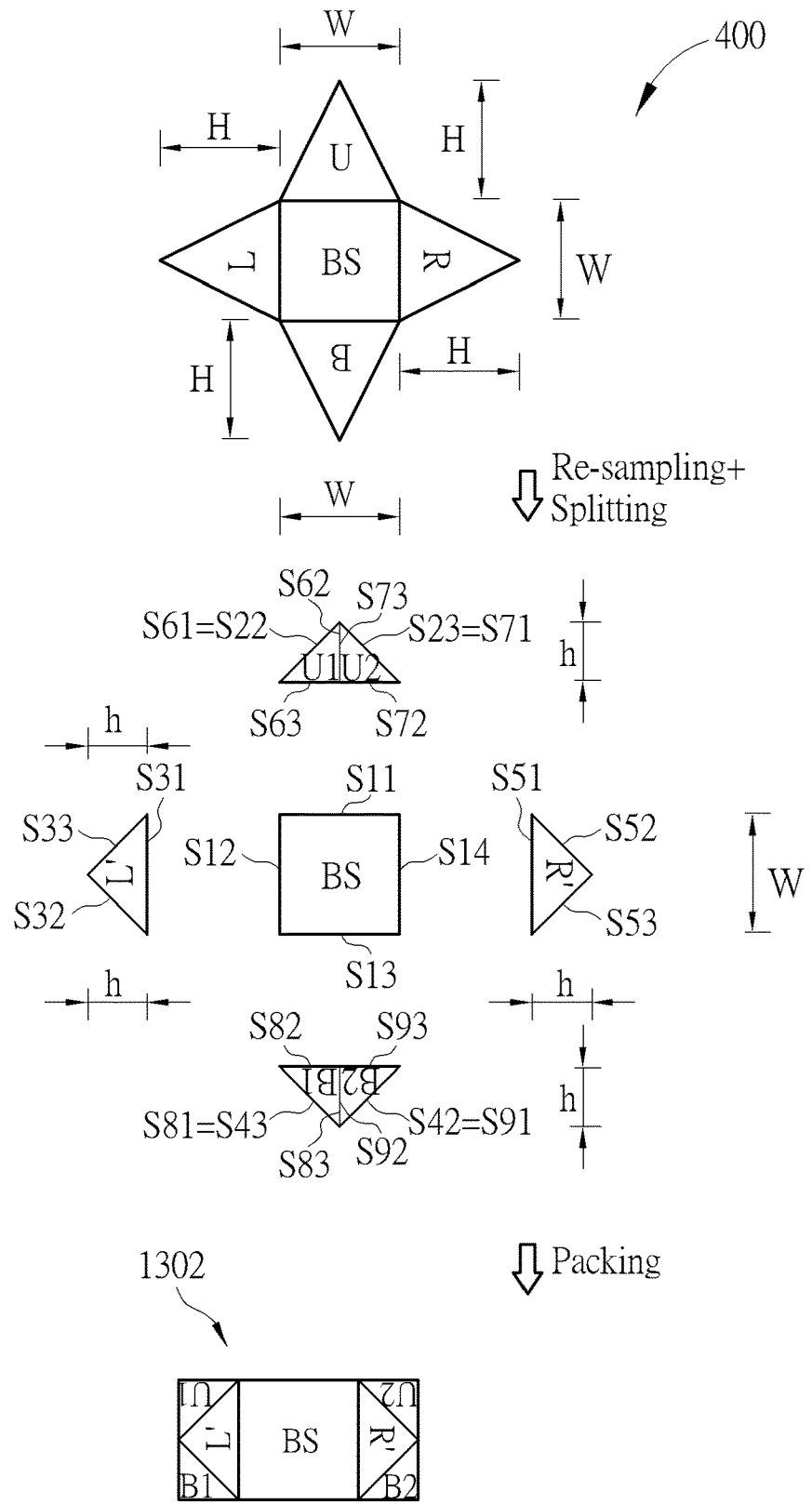
FIG. 13 is a diagram illustrating a third proposed viewport-based pyramid projection layout according to an embodiment of the present invention.

FIG. 13 is a diagram illustrating a third proposed viewport-based pyramid projection layout according to an embodiment of the present invention. The third proposed viewport-based pyramid projection layout 1302 may be derived from the pyramid projection layout 400 with projection face re-sampling (e.g., projection face down-scaling) and projection face splitting. As mentioned above, the lateral projection face U' is a re-sampled projection face obtained by re-sampling (e.g., down-scaling) the lateral projection face U in its height direction with the pre-defined re-sampling factor s (s=H/h), the lateral projection face B' is a re-sampled projection face obtained by re-sampling (e.g., down-scaling) the lateral projection face B in its height direction with the pre-defined re-sampling factor s (s=H/h), the lateral projection face L' is a re-sampled projection face obtained by re-sampling (e.g., down-scaling) the lateral projection face L in its height direction with the pre-defined re-sampling factor s (s=H/h), and the lateral projection face R' is a re-sampled projection face obtained by re-sampling (e.g., down-scaling) the lateral projection face R in its height direction with the pre-defined re-sampling factor s (s=H/h). After the lateral projection face U' is obtained, the lateral projection face U' is equally split into two right-triangle-shaped parts (denoted by "U1" and "U2"), as illustrated in the middle part of FIG. 13. Similarly, after the lateral projection face B' is obtained, the lateral projection face B' is equally split into two right-triangle-shaped parts (denoted by "B1" and "B2"), as illustrated in the middle part of FIG. 13.

The right-triangle-shaped part U1 has one hypotenuse S61 (which is also the cathetus S22 of the lateral projection face U'), one cathetus (leg) S62, and another cathetus (leg) S63 (which is a first half of the hypotenuse S21 of the lateral projection face U'). The right-triangle-shaped part U2 has one hypotenuse S71 (which is also the cathetus S23 of the lateral projection face U'), one cathetus (leg) S72 (which is a second half of the hypotenuse S21 of the lateral projection face U'), and another cathetus (leg) S73. The right-triangle-shaped part B1 has one hypotenuse S81 (which is also the cathetus S43 of the lateral projection face B'), one cathetus (leg) S82 (which is a first half of the hypotenuse S41 of the lateral projection face B'), and another cathetus (leg) S83. The right-triangle-shaped part B2 has one hypotenuse S91 (which is also the cathetus S42 of the lateral projection face B'), one cathetus (leg) S92, and another cathetus (leg) S93 (which is a second half of the hypotenuse S41 of the lateral projection face B').

After the right-triangle-shaped parts U1, U2, B1, and B2 and the lateral projection faces L' and R' are obtained, the base projection face BS (which is a square projection face corresponding to a user's viewport), the right-triangle-shaped parts U1, U2, B1, and B2, and the lateral projection faces L' and R' are packed in the third proposed viewport-based pyramid projection layout 1302. As shown in the bottom part of FIG. 13, hypotenuse S31 of the lateral projection face L' connects with side S12 of the base projection face BS, hypotenuse S51 of the lateral projection face R' connects with side S14 of the base projection face BS, hypotenuse S61 of the right-triangle-shaped part U1 connects with cathetus S33 of the lateral projection face L', hypotenuse S81 of the right-triangle-shaped part B1 connects with cathetus S32 of the lateral projection face L', hypotenuse S71 of the right-triangle-shaped part U2 connects with cathetus S52 of the lateral projection face R', and hypotenuse S91 of the right-triangle-shaped part B2 connects with cathetus S53 of the lateral projection face R'.

As mentioned above, the pyramid projection layout 400 corresponds to an unfolded pyramid, where an image continuity boundary exists between the lateral projection face U and the base projection face BS, an image continuity boundary exists between the lateral projection face L and the base projection face BS, an image continuity boundary exists between the lateral projection face B and the base projection face BS, and an image continuity boundary exists between the lateral projection face R and the base projection face BS. Since the lateral projection face U' is a re-sampled version of the lateral projection face U and is further split into two right-triangle-shaped parts U1 and U2, the lateral projection face B' is a re-sampled version of the lateral projection face B and is further split into two right-triangle-shaped parts B1 and B2, the lateral projection face L' is a re-sampled version of the lateral projection face L, and the lateral projection face R' is a re-sampled version of the lateral projection face R, an image continuity boundary exists between the hypotenuse S31 of the lateral projection face L' and the side S12 of the base projection face BS, an image continuity boundary exists between the hypotenuse S51 of the lateral projection face R' and the side S14 of the base projection face BS, an image continuity boundary exists between the hypotenuse S61 of the right-triangle-shaped part U1 and the cathetus S33 of the lateral projection face L', an image continuity boundary exists between the hypotenuse S81 of the right-triangle-shaped part B1 and the cathetus S32 of the lateral projection face L', an image continuity boundary exists between the hypotenuse S71 of the right-triangle-shaped part U2 and the cathetus S52 of the lateral projection face R', and an image continuity boundary exists between the hypotenuse S91 of the right-triangle-shaped part B2 and the cathetus S53 of the lateral projection face R'.

Compared to the pyramid projection layout 400, the third proposed viewport-based pyramid projection layout 1302 is more compact due to the fact that a shape of the third proposed viewport-based pyramid projection layout 1302 is a rectangle. In this way, a compact viewport-based pyramid projection layout is achieved, and can be used by the projection-based frame IMG to avoid the use of dummy areas (e.g., black areas or white areas) in the projection-based frame IMG. Further, the 360-degree image/video content is continuously represented in the base projection face BS, the lateral projection faces L' and R', and the right-triangle-shaped parts U1, U2, B1, and B2 with no image content discontinuity. That is, there is no image content discontinuity boundary caused by packing of projection faces. In this way, the coding efficiency is not degraded by the third proposed viewport-based pyramid projection layout 1302.

The proposed viewport-based pyramid projection layouts 1102, 1202, and 1302 are for illustrative purposes only, and are not meant to be limitations of the present invention. In practice, an alternative viewport-based pyramid projection layout may be obtained by applying a specific operation (e.g., face sequence adjustment, layout rotation, and/or layout mirroring) to any of the proposed viewport-based pyramid projection layouts 1102, 1202, and 1302. Taking the second proposed viewport-based pyramid projection layout 1202 for example, it may be modified by using a different side (e.g., S12) of the base projection face BS to connect with a hypotenuse of a different lateral projection face (e.g., L'). Taking the third proposed viewport-based projection layout 1302 for example, it may be modified by splitting each of the lateral projection faces L' and R' into two right-triangle-shaped parts, using one side S11 of the base projection face BS to connect with a hypotenuse of the lateral projection face U', and using another side S13 of the base projection face BS to connect with a hypotenuse of the lateral projection face B'. These alternative layout designs all fall within the scope of the present invention.

Figure 14:
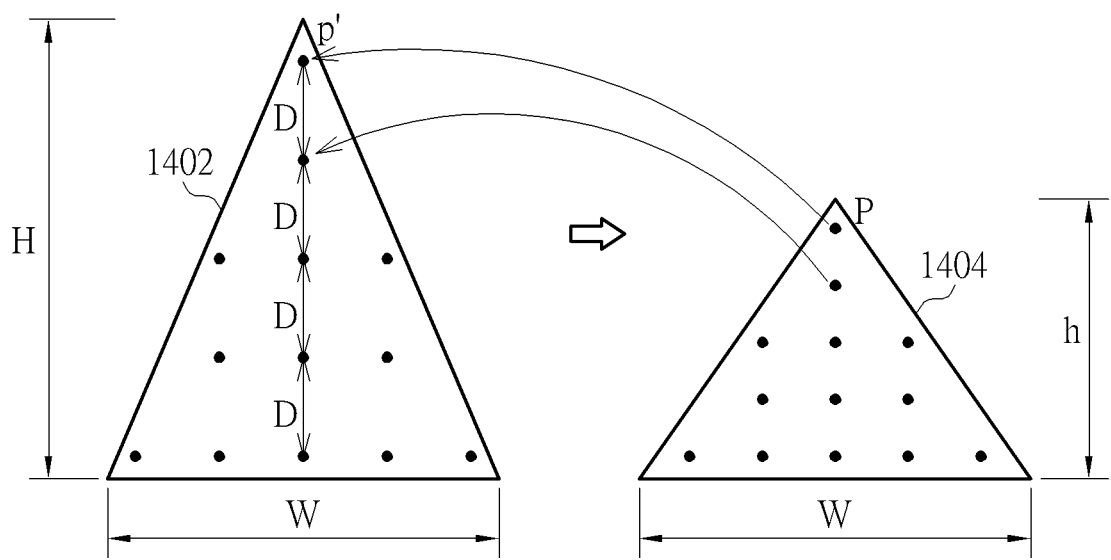
FIG. 14 is a diagram illustrating an example of re-sampling a triangular projection face through uniform mapping.
Figure 15:
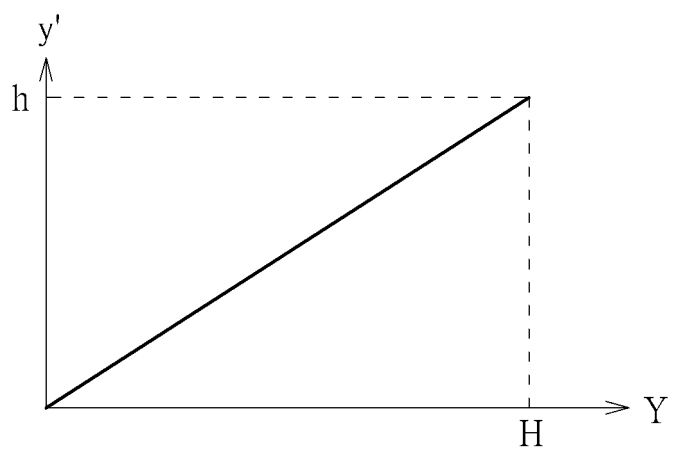
FIG. 15 is a diagram illustrating a curve of a uniform mapping function according to an embodiment of the present invention.

As mentioned above, each of the lateral projection faces U', B', L', and R' (which are right-triangle-shaped projection faces) is derived from re-sampling a corresponding lateral projection face U/B/L/R (which is a triangular projection face) that is obtained via pyramid projection of the sphere 202. In some embodiments of the present invention, re-sampling the corresponding lateral projection face U/B/L/R may be achieved by re-sampling the corresponding lateral projection face U/B/L/R through uniform mapping. Please refer to FIG. 14 in conjunction with FIG. 15. FIG. 14 is a diagram illustrating an example of re-sampling a triangular projection face through uniform mapping. FIG. 15 is a diagram illustrating a curve of a uniform mapping function according to an embodiment of the present invention. In this example, a triangular projection face 1404 is obtained by re-sampling (e.g., down-scaling) a triangular projection face 1402 in its height direction, where the triangular projection face 1402 has width (i.e., length of a base of the triangle) W and height (i.e., height of the triangle) H, and the triangular projection face 1404 has width (i.e., length of a base of the triangle) W and height (i.e., height of the triangle) h, where h<H. By way of example, but not limitation, the uniform mapping function may be expressed by using the following equation.

$$y' = \frac{h}{H} * Y \qquad (2)$$

Hence, regarding a pixel position located at a coordinate y' of y-axis in the triangular projection face 1404, a corresponding sampling point located at a coordinate Y of y-axis in the triangular projection face 1402 can be determined from the uniform mapping function expressed in equation (2). The pixel value of a position P in the triangular projection face 1404 is obtained by using the pixel value of the corresponding sampling position p' in the triangular projection face 1402. Due to the uniform mapping in the height direction, two vertically adjacent sampling points in the triangular projection face 1402 are uniformly distributed with a constant distance D.

A sampling point (i.e., the obtained pixel position p') in the triangular projection face 1402 may not be an integer position. If a y-axis coordinate Y of a sampling point in the triangular projection face 1402 is a non-integer position, an interpolation filter (not shown) in the conversion circuit 114 may be applied to integer pixels around the sampling point in the triangular projection face 1402 to derive the pixel value of the sampling point. For example, the interpolation filter may be a bilinear filter, a bicubic filter, or a Lanczos filter.

Figure 16:
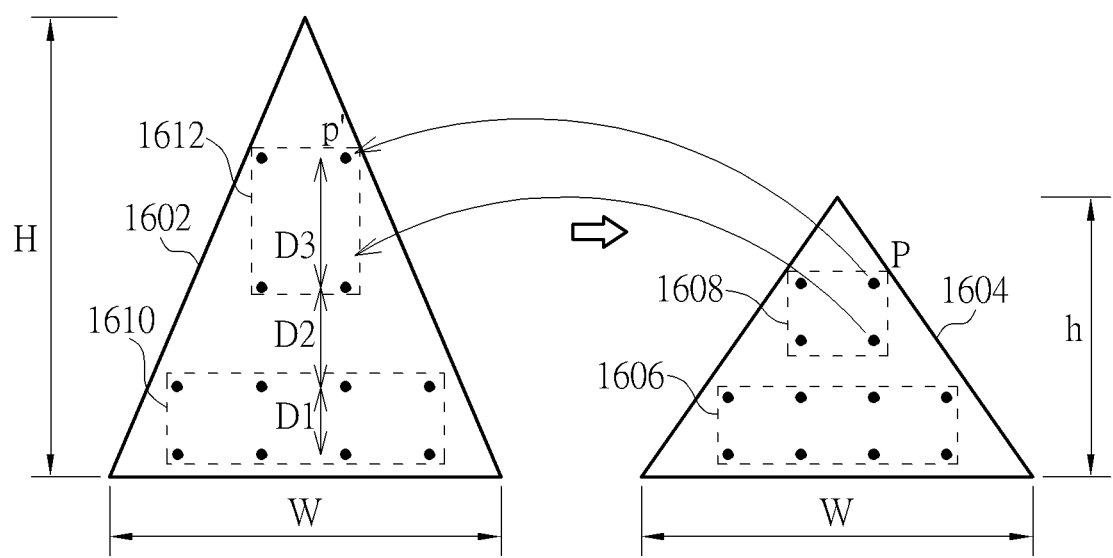
FIG. 16 is a diagram illustrating an example of re-sampling a triangular projection face through non-uniform mapping.
Figure 17:
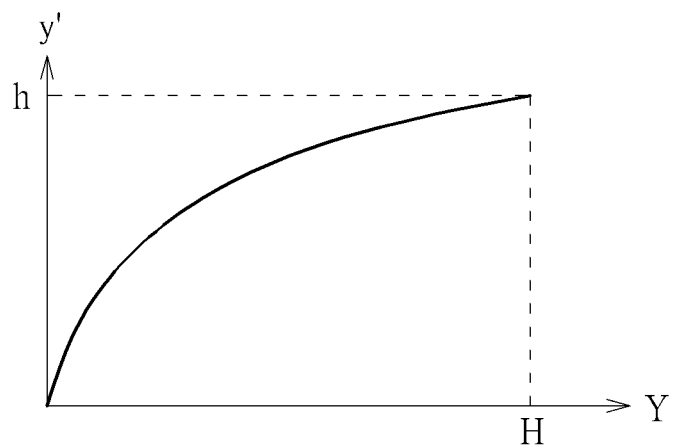
FIG. 17 is a diagram illustrating a curve of a non-uniform mapping function according to an embodiment of the present invention.

To preserve more details near the main projection face (e.g., the base projection face BS that corresponds to the user's viewport), the present invention further proposes re-sampling the corresponding lateral projection face U/B/L/R through non-uniform mapping. Please refer to FIG. 16 in conjunction with FIG. 17. FIG. 16 is a diagram illustrating an example of re-sampling a triangular projection face through non-uniform mapping. FIG. 17 is a diagram illustrating a curve of a non-uniform mapping function according to an embodiment of the present invention. In this example, a triangular projection face 1604 is derived from re-sampling (e.g., down-scaling) a triangular projection face 1602 in its height direction, where the triangular projection face 1602 has width (i.e., length of a base of the triangle) W and height (i.e., height of the triangle) H, and the triangular projection face 1604 has width (i.e., length of a base of the triangle) W and height (i.e., height of the triangle) h, where h<H. The non-uniform mapping function may be specified by a non-decreasing curve. For example, the non-uniform mapping function may be a piecewise-linear function or an exponential function. In a case where the non-uniform mapping function is an exponential function, the non-uniform mapping function may be expressed by using the following equation.

$$\frac{y'}{h} = 1 - \left(1 - \frac{Y}{H}\right)^n, \text{ where } n \text{ is positive and } n \ne 1 \quad (3)$$

To preserve more details near the main projection face (e.g., the base projection face BS that corresponds to the user's viewport), the value of n used in the equation (3) may be larger than 1 (i.e., n>1). Hence, the non-uniform mapping function with n>1 may be specified by the exemplary curve shown in FIG. 17.

Alternatively, the non-uniform mapping function may be expressed by using the following equation.

$$\frac{y'}{h} = \left(\frac{Y}{H}\right)^n, \text{ where } n \text{ is positive and } n \ne 1 \quad (4)$$

To preserve more details near the main projection face (e.g., the base projection face BS that corresponds to the user's viewport), the value of n used in the equation (4) may be smaller than 1 (i.e., 0<n<1). Hence, the non-uniform mapping function with 0<n<1 may also be specified by the exemplary curve shown in FIG. 17.

Regarding a pixel position located at a coordinate y' of y-axis in the triangular projection face 1604, a corresponding sampling point located at a coordinate Y of y-axis in the triangular projection face 1602 can be determined from the employed non-uniform mapping function. As shown in FIG. 16, the interval between two vertically adjacent sampling points is not a constant. For example, the interval between two vertically adjacent sampling points may be one of D1, D2, D3, where D3>D2>D1. Specifically, the sampling points are non-uniformly distributed in the height direction of the triangular projection face 1602. The pixel value of a position P in the triangular projection face 1604 is obtained by using the pixel value of the corresponding sampling position p' in the triangular projection face 1602. For example, pixels in a first re-sampled region 1606 in the triangular projection face 1604 are obtained by re-sampling a first source region 1610 of the triangular projection face 1602, and pixels in a second re-sampled region 1608 in the triangular projection face 1604 are obtained by re-sampling the second source region 1612 of the triangular projection face 1602. Due to the non-uniform mapping in the height direction, the density of sampling points obtained from the first source region 1610 is different from the density of sampling points obtained from the second source region 1612. In other words, the first re-sampled region 1606 is obtained by re-sampling the first source region 1610 with a first sampling density, and the second re-sampled region 1608 is obtained by re-sampling the second source region 1612 with a second sampling density, wherein the second sampling density is different from the first sampling density.

To preserve more details near the main projection face (e.g., the base projection face BS that corresponds to the user's viewport), the first sampling density and the second sampling density are properly controlled by the non-uniform mapping. Assuming that the first source region 1610 of the triangular projection face 1602 (e.g., one of the lateral projection faces U, B, L, and R in the pyramid projection layout 400 shown in FIG. 4) is closer to a center of the user's viewport (e.g., a center of the base projection face BS in the pyramid projection layout 400 shown in FIG. 4) than the second region 1612, the first sampling density is particularly set to be higher than the second sampling density. In this way, most of the pixels in the triangular projection face 1604 are obtained by re-sampling the first source region 1610 in the triangular projection face 1602.

A sampling point (i.e., the obtained pixel position p') in the triangular projection face 1602 may not be an integer position. If a y-axis coordinate Y of a sampling point in the triangular projection face 1602 is a non-integer position, an interpolation filter (not shown) in the conversion circuit 114 may be applied to integer pixels around the sampling point in the triangular projection face 1602 to derive the pixel value of the sampling point. For example, the interpolation filter may be a bilinear filter, a bicubic filter, or a Lanczos filter.

It should be noted that the aforementioned non-uniform mapping functions are for illustrative purposes, and are not meant to be limitations of the present invention. In some embodiments of the present invention, a different non-uniform mapping function may be employed by the conversion circuit 114 for projection face re-sampling. This also falls within the scope of the present invention.

Regarding re-sampled projection faces used by any of the first proposed viewport-based pyramid projection layout 1102, the second proposed viewport-based pyramid projection layout 1202, and the third proposed viewport-based pyramid projection layout 1302, more details near the main projection face (e.g., the base projection face BS) can be preserved by using non-uniform mapping in the re-sampling operation. For example, most of the pixels of the lateral projection face U' are obtained by re-sampling a base part of the lateral projection face U that is close to the side S11 of the base projection face BS, most of the pixels of the lateral projection face L' are obtained by re-sampling a base part of the lateral projection face L that is close to the side S12 of the base projection face BS, most of the pixels of the lateral projection face B' are obtained by re-sampling a base part of the lateral projection face B that is close to the side S13 of the base projection face BS, and most of the pixels of the lateral projection face R' are obtained by re-sampling a base part of the trilateral projection face R that is close to the side S14 of the base projection face BS. Since more details near the main projection face (e.g., the base projection face BS) can be preserved in the auxiliary projection faces (e.g., lateral projection bases U', B', L', and R') by the non-uniform mapping, the coding efficiency of the projection-based image IMG can be further improved. For example, compared to the coding efficiency of the projection-based image IMG having lateral projection faces U', B', L', and R' generated by re-sampling with uniform mapping, the coding efficiency of the projection-based image IMG having lateral projection faces U', B', L', and R' generated by re-sampling with non-uniform mapping is better.

In above embodiments, a first projection face (e.g., the base projection face BS) and a plurality of second projection faces (e.g., four lateral projection faces U, B, L, and R) are first obtained by mapping/projecting the omnidirectional content of the sphere 202 onto a pyramid 204/504/704/904 according to an employed pyramid projection type, and then re-sampled projection faces (e.g., four lateral projection faces U', B', L', and R') are obtained by re-sampling (e.g., down-scaling) the second projection faces, respectively. Next, the first projection face (e.g., the base projection face BS) and the re-sampled projection faces (e.g., four lateral projection faces U', B', L', and R') are packed in an employed viewport-based pyramid projection layout 1102/1202/1302. However, these are for illustrative purposes only, and are not meant to be limitations of the present invention. Alternatively, the step of mapping/projecting an omnidirectional content of a sphere onto a pyramid can be omitted. That is, generation of the base projection face BS and the lateral projection faces U, B, L, and R for different faces of a pyramid as illustrated in FIG. 4 can be omitted.

Figure 18:
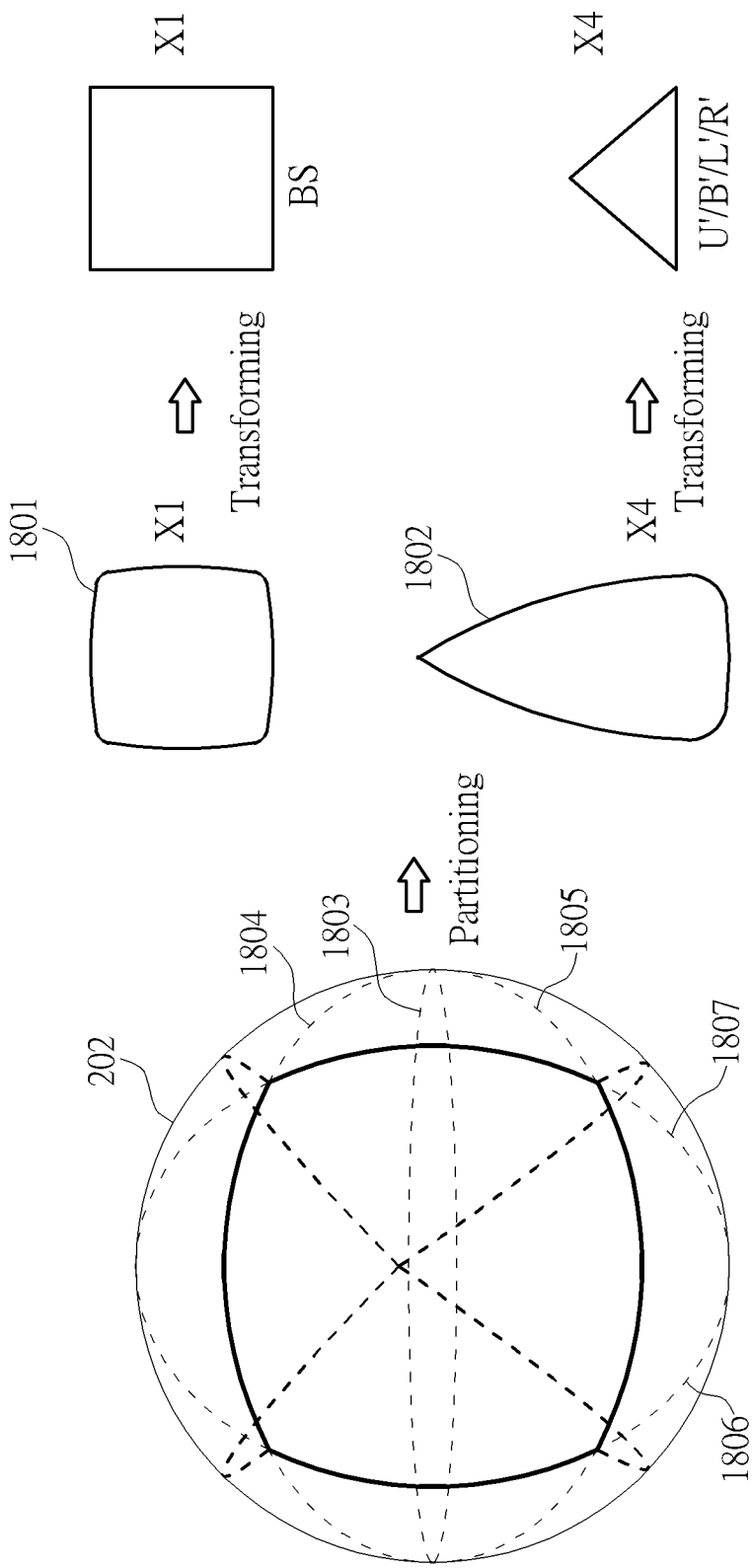
FIG. 18 is a diagram illustrating a fifth pyramid projection type according to an embodiment of the present invention.

FIG. 18 is a diagram illustrating a fifth pyramid projection type according to an embodiment of the present invention. In accordance with the fifth pyramid projection type, the omnidirectional content of the sphere 202 is partitioned into a first partial region 1801 and a plurality of second partial regions 1802 according to projection relationship between a pyramid and the sphere 202. In this example, the omnidirectional content of the sphere 202 is partitioned into five partial regions, including the first partial region 1801 and the second partial regions 1802, due to the fact that an employed pyramid projection layout (e.g., one of the proposed viewport-based pyramid projection layouts 1102, 1202, and 1302) is associated with a pyramid having one square base and four triangular lateral faces. In this example, the partitioning layout on the surface of the sphere 202 is defined by a plurality of circles 1803, 1804, 1805, 1806, and 1807, each of which has a center being a center of the sphere 202. To put it simply, boundaries of the first partial region 1801 and the second partial regions 1802 are determined by the circles 1803-1807.

The first partial region 1801 is equivalent to an image area defined by projecting the square base of the pyramid (e.g., one of the pyramids 204, 504, 704, and 904) onto a surface of the sphere 202, and the second partial regions 1802 are equivalent to image areas defined by projecting triangular lateral faces of the pyramid (e.g., one of the pyramids 204, 504, 704, and 904) onto the surface of the sphere 202.

After the first partial region 1801 and the second partial regions 1802 are obtained, the first partial region 1801 is directly transformed into the aforementioned base projection face BS (which is a square projection face), and the second partial regions 1802 are directly transformed into the aforementioned lateral projection faces U', and R' (which are right-triangle-shaped projection faces), respectively. For example, the transform from the first partial region 1801 to the base projection face BS may be achieved by using trigonometric functions, and/or the transform from the second partial regions 1802 to the lateral projection faces U', B', L', and R' may be achieved by using trigonometric functions. After the base projection face BS and the lateral projection faces U', B', L', and R' are obtained, the base projection face BS and the lateral projection faces U', B', L', and R' are packed in the employed pyramid projection layout (e.g., one of the proposed viewport-based pyramid projection layouts 1102, 1202, and 1302).

In some embodiments of the present invention, the aforementioned non-uniform mapping feature may be incorporated into the transform function applied to each of the second partial regions 1802. For example, the triangular projection face 1602 shown in FIG. 16 may be regarded as one of the second partial regions 1802, and the triangular projection face 1604 shown in FIG. 16 may be regarded as one of the lateral projection faces U', B', L', and R'. Hence, each of the second partial regions 1802 has a first source region (e.g., 1610) and a second source region (e.g., 1612), and a corresponding lateral projection face U'/B'/L'/R' has a first transformed region (e.g., 1606) and a second transformed region (e.g., 1608). The first transformed region (e.g., 1606) is derived from transforming the first source region (e.g., 1610) with a first sampling density, and the second transformed region (e.g., 1608) is derived from transforming the second source region (e.g., 1612) with a second sampling density, wherein the second sampling density is different from the first sampling density. To preserve more details near the main projection face (e.g., the base projection face BS that corresponds to the user's viewport), the first sampling density and the second sampling density are properly controlled by the transform function. Assuming that the first source region (e.g., 1610) of one second partial region 1802 is closer to a center of the user's viewport (e.g., a center of the first partial region 1801) than the second region (e.g., 1612), the first sampling density is particularly set to be higher than the second sampling density. In this way, most of the pixels in the corresponding lateral projection face U'/B'/L'/R' are obtained by transforming the first source region (e.g., 1610) in the second partial region 1802.

As mentioned above, the omnidirectional content of the sphere 202 (i.e., the surface of the sphere 202) is required to be partitioned into five partial regions that can be used to obtain the base projection face BS and the lateral projection faces U', B', L', and R' corresponding to a pyramid with one square base and four triangular lateral faces. However, the partitioning layout on the surface of the sphere 202 may be adjusted, depending upon the actual design considerations.

Figure 19:
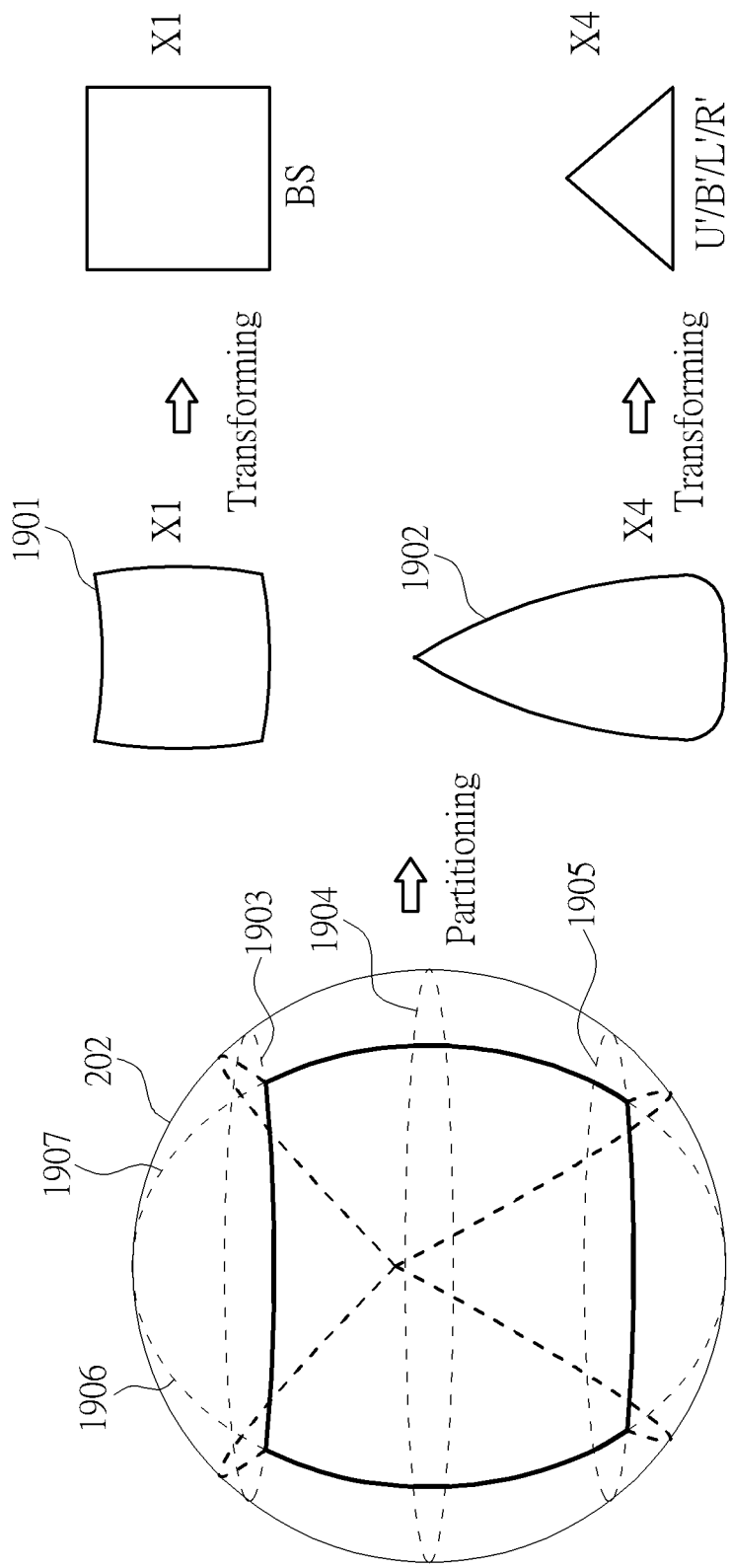
FIG. 19 is a diagram illustrating a sixth pyramid projection type according to an embodiment of the present invention.

FIG. 19 is a diagram illustrating a sixth pyramid projection type according to an embodiment of the present invention. In accordance with the sixth pyramid projection type, the omnidirectional content of the sphere 202 is partitioned into a first partial region 1901 and a plurality of second partial regions 1902 according to the projection relationship between a pyramid and the sphere 202. The partitioning layout on the surface of the sphere 202 shown in FIG. 19 is different from that shown in FIG. 18. Hence, the shape of the first partial region 1901 may be different from that of the first partial region 1801, and/or shapes of the second partial regions 1902 may be different from that of the second partial regions 1802. In this example, the partitioning layout on the surface of the sphere 202 may be defined by a plurality of circles 1903, 1904, 1905, 1906, and 1907. Regarding each of the circles 1903-1905, it has a center located at one central axis which passes through a center of the sphere 202. Regarding each of the circles 1906 and 1907, it has a center being the center of the sphere 202. To put it simply, boundaries of the first partial region 1901 and the second partial regions 1902 are determined by the circles 1903-1907.

The first partial region 1901 is directly transformed into the aforementioned base projection face BS (which is a square projection face), and the second partial regions 1902 are directly transformed into the aforementioned lateral projection faces U', B', L', and R' (which are right-triangle-shaped projection faces), respectively. For example, the transform from the first partial region 1901 to the base projection face BS may be achieved by using trigonometric functions, and/or the transform from the second partial regions 1902 to the lateral projection faces U', B', L', and R' may be achieved by using trigonometric functions. Like the embodiment shown in FIG. 18, the aforementioned non-uniform mapping feature may be incorporated into the transform function applied to each of the second partial regions 1902. The base projection face BS and the lateral projection faces U', B', L', and R' are packed in an employed pyramid projection layout (e.g., one of the proposed viewport-based pyramid projection layouts 1102, 1202, and 1302).

Figure 20:
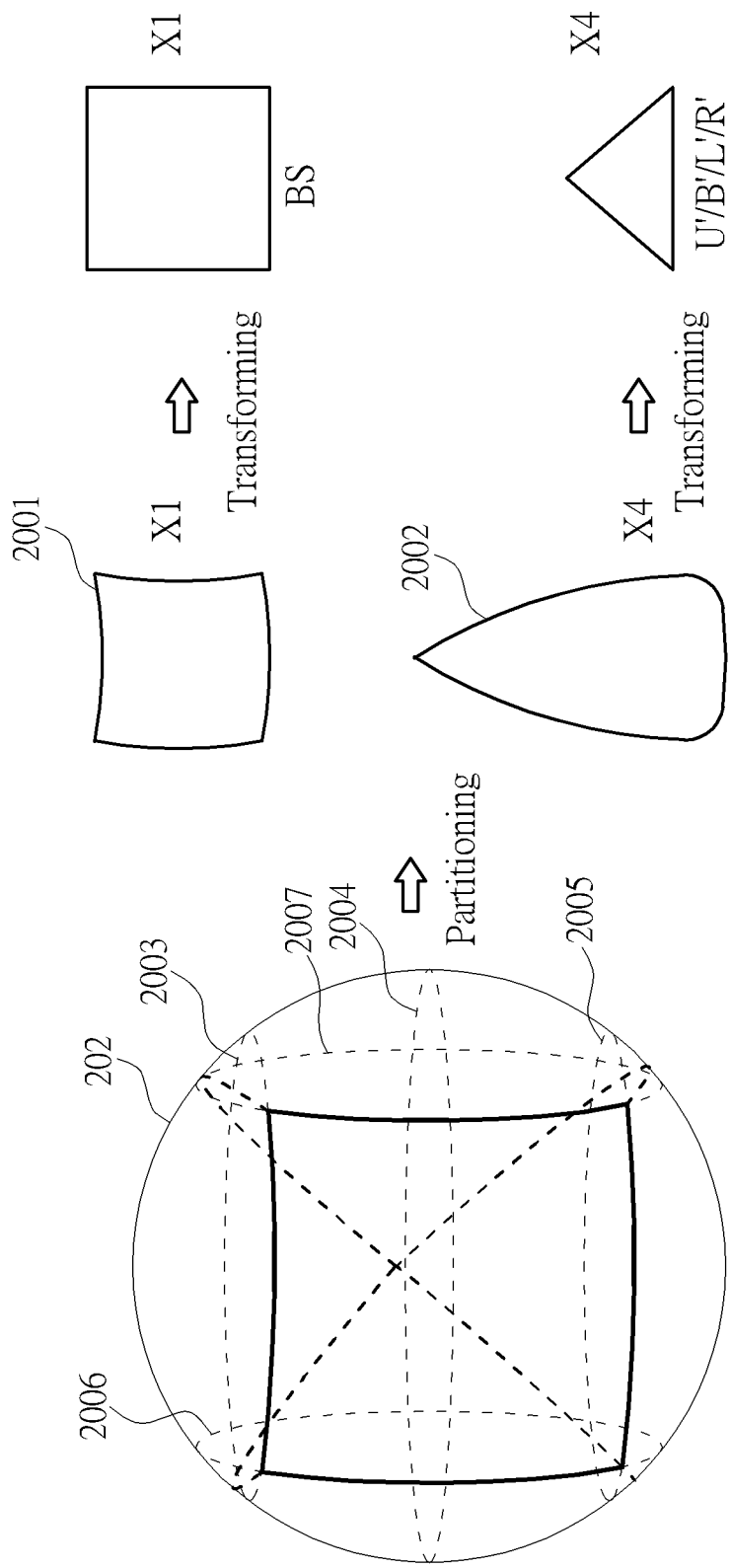
FIG. 20 is a diagram illustrating a seventh pyramid projection type according to an embodiment of the present invention.

FIG. 20 is a diagram illustrating a seventh pyramid projection type according to an embodiment of the present invention. In accordance with the seventh pyramid projection type, the omnidirectional content of the sphere 202 is partitioned into a first partial region 2001 and a plurality of second partial regions 2002 according to the projection relationship between a pyramid and the sphere 202. The partitioning layout on the surface of the sphere 202 shown in FIG. 20 is different from that shown in FIG. 18/FIG. 19. Hence, the shape of the first partial region 2001 may be different from that of the first partial region 1801/1901, and/or shapes of the second partial regions 2002 may be different from that of the second partial regions 1802/1902. In this example, the partitioning layout on the surface of the sphere 202 may be defined by a plurality of circles 2003, 2004, 2005, 2006, and 2007, each of which has a center located at one central axis which passes through a center of the sphere 202. To put it simply, boundaries of the first partial region 2001 and the second partial regions 2002 are determined by the circles 2003-2007.

The first partial region 2001 is directly transformed into the aforementioned base projection face BS (which is a square projection face), and the second partial regions 2002 are directly transformed into the aforementioned lateral projection faces U', B', L', and R' (which are right-triangle-shaped projection faces), respectively. For example, the transform from the first partial region 2001 to the base projection face BS may be achieved by using trigonometric functions, and/or the transform from the second partial regions 2002 to the lateral projection faces U', B', L', and R' may be achieved by using trigonometric functions. Like the embodiment shown in in FIG. 18, the aforementioned non-uniform mapping feature may be incorporated into the transform function applied to each of the second partial regions 2002. The base projection face BS and the lateral projection faces U', B', L', and R' are packed in an employed pyramid projection layout (e.g., one of the proposed viewport-based pyramid projection layouts 1102, 1202, and 1302).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
receiving an omnidirectional content corresponding to a sphere;
generating a projection-based frame according to the omnidirectional content and a pyramid projection layout, wherein the projection-based frame has a 360-degree content represented by a base projection face and a plurality of lateral projection faces packed in the pyramid projection layout, the base projection face and the lateral projection faces are obtained according to at least projection relationship between a pyramid and the sphere, a shape of the base projection face is a square, a shape of each of the lateral projection faces is a triangle, and a number of the lateral projection faces is equal to four; and
encoding, by a video encoder, the projection-based frame to generate a part of a bitstream;
wherein generating the projection-based frame according to the omnidirectional content and the pyramid projection layout comprises:
mapping the omnidirectional content of the sphere onto a base and a plurality of lateral faces of the pyramid to generate a first projection face and a plurality of second projection faces, respectively;
deriving the base projection face from the first projection face; and
deriving the lateral projection faces from the second projection faces, respectively, wherein each of the lateral projection faces is derived from re-sampling a corresponding second projection face in its height direction, and re-sampling the corresponding second projection face comprises:
re-sampling the corresponding second projection face through non-uniform mapping, wherein the corresponding second projection face has a first source region and a second source region, said each of the lateral projection faces has a first re-sampled region and a second re-sampled region, the first re-sampled region is derived from re-sampling the first source region with a first sampling density, and the second re-sampled region is derived from re-sampling the second source region with a second sampling density that is different from the first sampling density.

2. The video processing method of claim 1, wherein the sphere is fully inside the pyramid.

3. The video processing method of claim 2, wherein the sphere is an inscribed sphere of the pyramid.

4. The video processing method of claim 1, wherein the pyramid is fully inside the sphere.

5. The video processing method of claim 4, wherein the sphere is a circumscribed sphere of the pyramid.

6. The video processing method of claim 4, wherein the sphere touches all vertices of the pyramid except an apex of the pyramid.

7. The video processing method of claim 6, wherein a height of the pyramid between the apex of the pyramid and a base of the pyramid is equal to or smaller than an edge length of the base.

8. The video processing method of claim 1, wherein the first projection face corresponds to a user's viewport, the first source region is closer to a center of the user's viewport, and the first sampling density is higher than the second sampling density.

9. The video processing method of claim 1, wherein a shape of the pyramid projection layout is a square, a shape of the base projection face is a square, a shape of each of lateral projection faces is a right triangle, the lateral projection faces comprise a first lateral projection face, a second lateral projection face, a third lateral projection face and a fourth lateral projection face, a hypotenuse of the first lateral projection face connects with a first side of the base projection face, a hypotenuse of the second lateral projection face connects with a second side of the base projection face, a hypotenuse of the third lateral projection face connects with a third side of the base projection face, and a hypotenuse of the fourth lateral projection face connects with a fourth side of the base projection face.

10. The video processing method of claim 9, wherein there is an image continuity boundary between the hypotenuse of the first lateral projection face and the first side of the base projection face, there is an image continuity boundary between the hypotenuse of the second lateral projection face and the second side of the base projection face, there is an image continuity boundary between the hypotenuse of the third lateral projection face and the third side of the base projection face, and there is an image continuity boundary between the hypotenuse of the fourth lateral projection face and the fourth side of the base projection face.

11. The video processing method of claim 1, wherein a shape of the pyramid projection layout is a rectangle, a shape of the base projection face is a square, a shape of each of lateral projection faces is a right triangle, the lateral projection faces comprise a first lateral projection face, a second lateral projection face, a third lateral projection face and a fourth lateral projection face, a hypotenuse of the first lateral projection face connects with one side of the base projection face, one cathetus of the first lateral projection face connects with one cathetus of the second lateral projection face, another cathetus of the first lateral projection face connects with one cathetus of the third lateral projection face, one cathetus of the fourth lateral projection face connects with another cathetus of the second lateral projection face, and another cathetus of the fourth lateral projection face connects with another cathetus of the third lateral projection face.

12. The video processing method of claim 11, wherein there is an image continuity boundary between the hypotenuse of the first lateral projection face and said one side of the base projection face, there is an image continuity boundary between said one cathetus of the first lateral projection face and said one cathetus of the second lateral projection face, there is an image continuity boundary between said another cathetus of the first lateral projection face and said one cathetus of the third lateral projection face, there is an image continuity boundary between said one cathetus of the fourth lateral projection face and said another cathetus of the second lateral projection face, and there is an image continuity boundary between said another cathetus of the fourth lateral projection face and said another cathetus of the third lateral projection face.

13. The video processing method of claim 1, wherein a shape of the pyramid projection layout is a rectangle, a shape of the base projection face is a square, a shape of each of lateral projection faces is a right triangle, the lateral projection faces comprise a first lateral projection face, a second lateral projection face, a third lateral projection face and a fourth lateral projection face, the first lateral projection face is split into a first right-triangle-shaped part and a second right-triangle-shaped part, the second lateral projection face is split into a third right-triangle-shaped part and a fourth right-triangle-shaped part, a hypotenuse of the third lateral projection face connects with a first side of the base projection face, a hypotenuse of the fourth lateral projection face connects with a second side of the base projection face that is opposite to the first side of the base projection face, a hypotenuse of the first right-triangle-shaped part connects with one cathetus of the third lateral projection face, a hypotenuse of the third right-triangle-shaped part connects with another cathetus of the third lateral projection face, a hypotenuse of the second right-triangle-shaped part connects with one cathetus of the fourth lateral projection face, and a hypotenuse of the fourth right-triangle-shaped part connects with another cathetus of the fourth lateral projection face.

14. The video processing method of claim 13, wherein there is an image continuity boundary between the hypotenuse of the third lateral projection face and the first side of the base projection face, there is an image continuity boundary between the hypotenuse of the fourth lateral projection face and the second side of the base projection face, there is an image continuity boundary between the hypotenuse of the first right-triangle-shaped part and said one cathetus of the third lateral projection face, there is an image continuity boundary between the hypotenuse of the third right-triangle-shaped part and said another cathetus of the third lateral projection face, there is an image continuity boundary between the hypotenuse of the second right-triangle-shaped part and said one cathetus of the fourth lateral projection face, and there is an image continuity boundary between the hypotenuse of the fourth right-triangle-shaped part and said another cathetus of the fourth lateral projection face.

15. A video processing apparatus comprising:
a conversion circuit, arranged to receive an omnidirectional content corresponding to a sphere, and generate a projection-based frame according to the omnidirectional content and a pyramid projection layout, wherein the projection-based frame has a 360-degree content represented by a base projection face and a plurality of lateral projection faces packed in the pyramid projection layout, the base projection face and the lateral projection faces are obtained according to at least projection relationship between a pyramid and the sphere, a shape of the base projection face is a square, a shape of each of the lateral projection faces is a triangle, and a number of the lateral projection faces is equal to four; and
a video encoder, arranged to encode the projection-based frame to generate a part of a bitstream;
wherein the conversion circuit maps the omnidirectional content of the sphere onto a base and a plurality of lateral faces of the pyramid to generate a first projection face and a plurality of second projection faces, respectively, derives the base projection face from the first projection face, and derives the lateral projection faces from the second projection faces, respectively;
wherein the conversion circuit derives each of the lateral projection faces from re-sampling a corresponding second projection face in its height direction;
wherein the conversion circuit re-samples the corresponding second projection face through non-uniform mapping, where the corresponding second projection face has a first source region and a second source region, said each of the lateral projection faces has a first re-sampled region and a second re-sampled region, the first re-sampled region is derived from re-sampling the first source region with a first sampling density, and the second re-sampled region is derived from re-sampling the second source region with a second sampling density that is different from the first sampling density.

16. The video processing method of claim 1, wherein said each of the lateral projection faces includes a first pixel, a second pixel, and a third pixel that are mapped to a first sampling point, a second sampling point, and a third sampling point in the corresponding second projection face through said non-uniform mapping, respectively; an interval between the first pixel and the second pixel is equal to an interval between the second pixel and the third pixel; and an interval between the first sampling point and the second sampling point is different from an interval between the second sampling point and the third sampling point.

17. The video processing apparatus of claim 15, wherein said each of the lateral projection faces includes a first pixel, a second pixel, and a third pixel that are mapped to a first sampling point, a second sampling point, and a third sampling point in the corresponding second projection face through said non-uniform mapping, respectively; an interval between the first pixel and the second pixel is equal to an interval between the second pixel and the third pixel; and an interval between the first sampling point and the second sampling point is different from an interval between the second sampling point and the third sampling point.

* * * * *